US 009764711 B2

United States Patent
Narita et al.

(10) Patent No.: US 9,764,711 B2
(45) Date of Patent: Sep. 19, 2017

(54) VEHICLE POP-UP HOOD DEVICE

(71) Applicant: TOYOTA JIDOSHA KABUSHIKI KAISHA, Toyota-shi, Aichi (JP)

(72) Inventors: Sotaro Narita, Toyota (JP); Yoshinori Uozumi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/115,815

(22) PCT Filed: Jun. 25, 2015

(86) PCT No.: PCT/JP2015/068420
§ 371 (c)(1),
(2) Date: Aug. 1, 2016

(87) PCT Pub. No.: WO2016/021326
PCT Pub. Date: Feb. 11, 2016

(65) Prior Publication Data
US 2017/0136985 A1    May 18, 2017

(30) Foreign Application Priority Data

Aug. 7, 2014 (JP) ................................. 2014-161504

(51) Int. Cl.
| | |
|---|---|
| *B60K 28/10* | (2006.01) |
| *B60R 21/38* | (2011.01) |
| *E05F 3/16* | (2006.01) |
| *B62D 25/10* | (2006.01) |
| *E05D 7/086* | (2006.01) |

(52) U.S. Cl.
CPC ................ *B60R 21/38* (2013.01); *E05F 3/16* (2013.01); *B62D 25/10* (2013.01); *E05D 7/086* (2013.01)

(58) Field of Classification Search
CPC ....................................................... B60R 21/38
USPC ..... 296/187.04, 193.11; 180/271, 274, 69.21
See application file for complete search history.

(56) References Cited

U.S. PATENT DOCUMENTS

| | | | |
|---|---|---|---|
| 6,345,679 B1 * | 2/2002 | Sasaki | ..................... B60R 21/38 180/271 |
| 6,618,904 B1 | 9/2003 | Nagy | |
| 6,964,316 B1 * | 11/2005 | Polz | ........................ B60R 21/34 16/222 |

(Continued)

FOREIGN PATENT DOCUMENTS

| | | |
|---|---|---|
| JP | 2002-037016 A | 2/2002 |
| JP | 2006-224890 A | 8/2006 |

(Continued)

*Primary Examiner* — Toan To
(74) *Attorney, Agent, or Firm* — Oliff PLC

(57) ABSTRACT

A vehicle pop-up hood device includes: a hinge base that is fixed to a vehicle body; a first arm that is pivotably connected to the hinge base; and a second arm that is fixed to a vehicle rear side end portion of a front hood and is pivotably connected to the first arm. Further, the vehicle pop-up hood device includes: an actuator that is provided between the first arm and the second arm, and that, by being operated, pivots the second arm with respect to the first arm; and a connecting portion that, at a time of completion of operation of the actuator, is set in an operating state in which the connecting portion restricts movement of the second arm with respect to the hinge base.

13 Claims, 20 Drawing Sheets

(56) References Cited

U.S. PATENT DOCUMENTS

| | | | | |
|---|---|---|---|---|
| 8,768,574 | B1* | 7/2014 | Shaw | B60R 21/38 |
| | | | | 180/274 |
| 2002/0014367 | A1 | 2/2002 | Sasaki et al. | |
| 2008/0189015 | A1* | 8/2008 | Borg | B62D 25/12 |
| | | | | 701/45 |
| 2009/0048734 | A1 | 2/2009 | Iwai et al. | |
| 2009/0072587 | A1 | 3/2009 | Inomata et al. | |
| 2010/0024162 | A1* | 2/2010 | Walz | B60R 21/38 |
| | | | | 16/233 |
| 2012/0084942 | A1* | 4/2012 | Mehta | B60R 21/38 |
| | | | | 16/223 |
| 2015/0060180 | A1* | 3/2015 | Yang | B60R 21/38 |
| | | | | 180/274 |
| 2016/0245003 | A1* | 8/2016 | McIntyre | B60R 21/38 |

FOREIGN PATENT DOCUMENTS

| | | |
|---|---|---|
| JP | 2009-045965 A | 3/2009 |
| JP | 2009-067303 A | 4/2009 |
| JP | 2009-096339 A | 5/2009 |
| JP | 2009-202871 A | 9/2009 |
| JP | 2015-039978 A | 3/2015 |

* cited by examiner

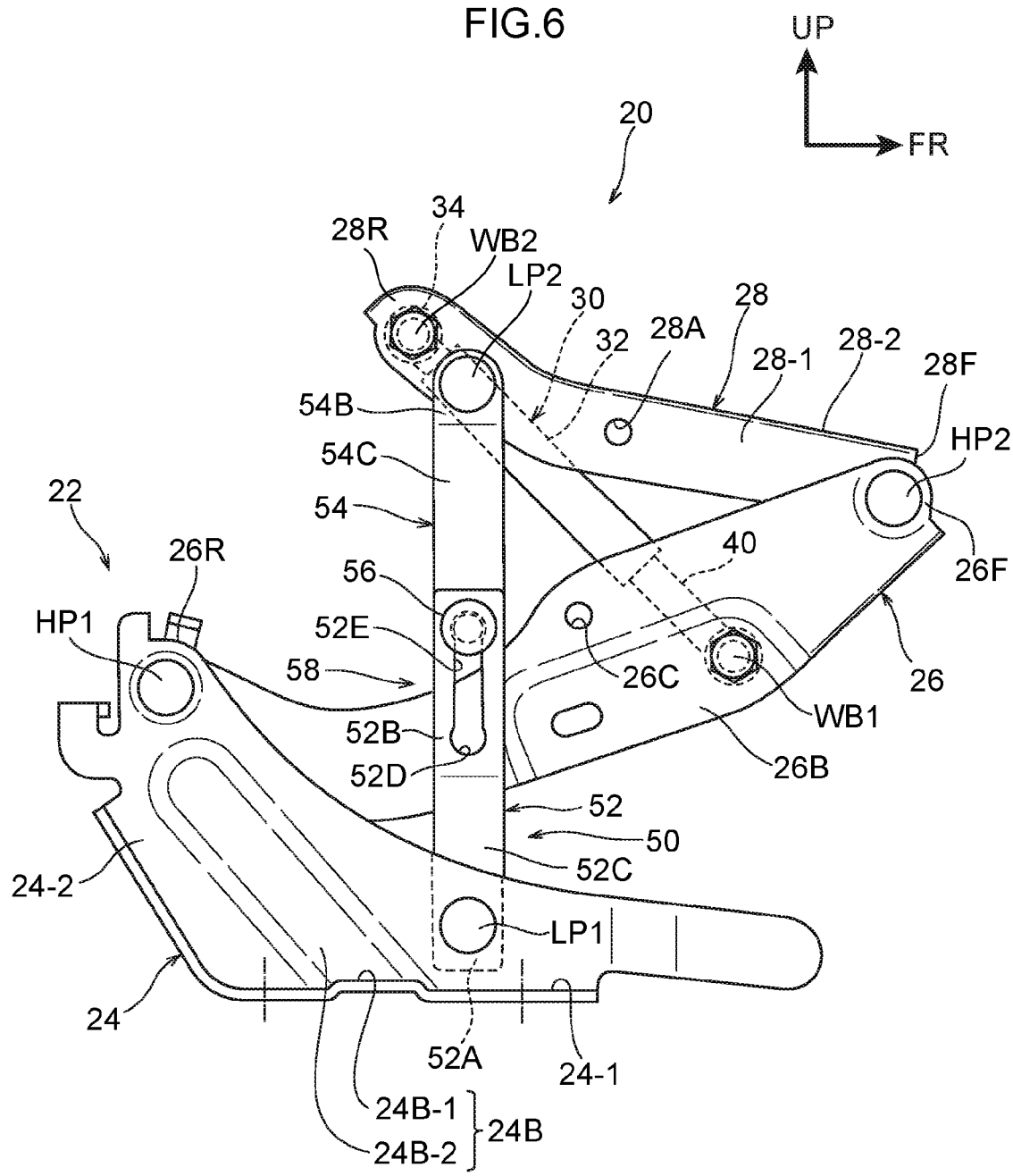

VEHICLE POP-UP HOOD DEVICE

TECHNICAL FIELD

The present invention relates to a vehicle pop-up hood device.

BACKGROUND ART

Vehicle pop-up hood devices that pop-up the rear end portion of a hood (the front hood) or pop-up the entire hood are disclosed in following Patent Document 1 through Patent Document 7. In the pop-up hood devices recited in these documents, the hood is popped-up due to the operational force of actuators being transmitted to the hood via hood hinges, or due to the operational force of actuators being directly transmitted to the hood.

PRIOR ART DOCUMENTS

Patent Documents

Patent Document 1: Japanese Patent Application Laid-Open (JP-A) No. 2009-202871
Patent Document 2: JP-A No. 2009-67303
Patent Document 3: JP-A No. 2006-224890
Patent Document 4: JP-A No. 2009-45965
Patent Document 5: JP-A No. 2009-96339
Patent Document 6: JP-A No. 2002-037016
Patent Document 7: JP-A No. 2015-039978

SUMMARY OF INVENTION

Technical Problem

However, because the actuators are structured to as to extend to a predetermined length instantaneously, when the hood is popped-up to predetermined position by the operational force of the actuators, it is thought that the hood will vibrate at the time of completion of the popping-up.

In view of the above-described circumstances, an object of the present invention is to provide a vehicle pop-up hood device that can suppress vibration of a hood at a time of completion of popping-up.

Solution to Problem

A vehicle pop-up hood device relating to a first aspect comprises: a hinge base that is fixed to a vehicle body; a first arm that is pivotably connected to the hinge base; a second arm that is fixed to a vehicle transverse direction outer side end portion at a rear portion of a hood, and is pivotably connected to the first arm, and that, by being pivoted with respect to the first arm, moves the vehicle transverse direction outer side end portion at the rear portion of the hood toward a vehicle upper side; an actuator that is provided between the first arm and the second arm, and that, by being operated, pivots the second arm with respect to the first arm and raises the hood up from a closed position to a raised position; and a connecting portion whose one end portion is connected to the hinge base and whose other end portion is connected to the second arm, and that, at the closed position of the hood, is set in a stored state, at a time of completion of operation of the actuator, the connecting portion being set in an operating state in which the connecting portion restricts movement of the second arm toward the vehicle upper side with respect to the hinge base.

In accordance with the above-described structure, when it is detected that a pedestrian or the like has collided with the front portion of the vehicle, and the actuator operates, the second arm is pivoted with respect to the first arm, and the vehicle transverse direction outer side end portion at the rear portion of the hood is moved toward the vehicle upper side. Namely, the hood is popped-up to the raised position.

Here, due to the connecting portion, that is in the stored state, being set in the operating state at the time of completion of operation of the actuator, movement of the second arm toward the vehicle upper side with respect to the hinge base is restricted. Namely, the second arm is connected by the connecting portion to the hinge base that is fixed to a region of high rigidity at the vehicle body, and movement of the second arm toward the vehicle upper side with respect to the hinge base is restricted. Due thereto, shaking at the vehicle transverse direction outer side end portion of the hood can be suppressed. Accordingly, vibration of the hood at the time of completion of popping-up can be suppressed.

In a vehicle pop-up hood device relating to a second aspect, in the first aspect, at a time when the first arm is pivoted with respect to the hinge base in a non-operating state of the actuator, the connecting portion is switched from the stored state to a pivoting restricting state, and restricts a range of pivoting of the hood.

In accordance with the above-described structure, when the first arm is pivoted with respect to the hinge base in the non-operating state of the actuator, the connecting portion switches from the stored state to the pivoting restricting state. Due thereto, the range of pivoting of the hood is restricted. Namely, there is no need to separately provide a restricting portion that restricts the range of pivoting of the hood. As a result, simplification of the structure of the vehicle pop-up hood device can be devised.

In a vehicle pop-up hood device relating to a third aspect, in the first or second aspect, the connecting portion is structured to include a first link that structures one end side of the connecting portion and that is pivotably connected to the hinge base, a second link that structures the other end side of the connecting portion and that is pivotably connected to the second arm, and a connecting shaft that is provided at one of the first link and the second link and that is pivotably supported at a connection hole formed in the other of the first link and the second link.

In accordance with the above-described structure, the connecting portion is structured to include a first link and a second link, and the first link and the second link are connected by the connecting shaft. Namely, the connecting portion is structured as a link mechanism. Due thereto, the connecting portion can be switched from the stored state to the operating state by a simple structure, in correspondence with the state of pivoting of the first arm and the second arm.

In a vehicle pop-up hood device relating to a fourth aspect, in the third aspect, the connecting portion has a displacement mechanism that permits displacement toward the vehicle upper side at the other end portion of the connecting portion, and, when a predetermined load toward the vehicle upper side is applied to the other end portion of the connecting portion by the hood that has been raised to the raised position, the displacement mechanism operates and permits displacement toward the vehicle upper side at the other end portion of the connecting portion, and permits movement of the second arm to an upper limit position that is further toward the vehicle upper side than the raised position.

In accordance with the above-described structure, when the vehicle transverse direction central portion at the rear portion of the hood that has been raised-up overshoots further toward the vehicle upper side than the raised position, and a predetermined load toward the vehicle upper side is applied by the hood to the other end portion of the connecting portion, the displacement mechanism operates. Due thereto, displacement toward the vehicle upper side at the other end portion of the connecting portion is permitted, and the second arm moves toward the upper limit position that is further toward the vehicle upper side than the raised position. Therefore, the vehicle transverse direction outer side end portion at the rear portion of the hood is opened at the upper limit position. Accordingly, vibration of the hood that arise due to overshooting can be damped at an early stage.

In a vehicle pop-up hood device relating to a fifth aspect, in the fourth aspect, the displacement mechanism is structured to absorb vibration energy of the hood due to the other end portion of the connecting portion being displaced from the raised position to the upper limit position.

In accordance with the above-described structure, when the other end portion of the connecting portion is displaced toward the vehicle upper side by the displacement mechanism, vibration energy of the hood is absorbed by the displacement mechanism. Therefore, the vibration damping effect by the displacement mechanism can be improved.

In a vehicle pop-up hood device relating to a sixth aspect, in the fifth aspect, the displacement mechanism is structured to include the connecting shaft, and a groove portion that is formed in the other of the first link and the second link and whose one end portion communicates with the connection hole, and, in the operating state, the groove portion is disposed so as to extend in a vehicle vertical direction, and a width dimension of the groove portion is set to be smaller than a diameter dimension of the connecting shaft.

In accordance with the above-described structure, the displacement mechanism has a groove portion that communicates with the connection hole, and, in the operating state, the groove portion is disposed so as to extend in the vehicle vertical direction. Here, the width dimension of the groove portion is set to be smaller than the diameter dimension of the connecting shaft. Therefore, at the time of operation of the displacement mechanism, the connecting shaft moves along the groove portion toward the vehicle upper side while sliding on the inner peripheral surface of the groove portion, and the other end portion of the connecting portion is displaced toward the vehicle upper side. Due thereto, vibration energy of the hood can be absorbed by the frictional force that arises between the connecting shaft and the groove portion.

In a vehicle pop-up hood device relating to a seventh aspect, in the sixth aspect, the displacement mechanism has a holding hole that is formed at the other end portion of the groove portion, and, at the upper limit position, the connecting shaft is held by the holding hole.

In accordance with the above-described structure, at the upper limit position, the connecting shaft is held by the holding hole of the groove portion. Therefore, the hood can be held at the upper limit position in a state in which vibration of the hood is suppressed.

In a vehicle pop-up hood device relating to an eighth aspect, in the sixth or seventh aspect, at the displacement mechanism, sliding resistance of the connecting shaft with respect to the groove portion when the connecting shaft moves from the other end of the groove portion to the one end of the groove portion, is set to be lower than sliding resistance of the connecting shaft with respect to the groove portion when the connecting shaft moves from the one end of the groove portion to the other end of the groove portion.

In accordance with the above-described structure, the hood that is disposed at the upper limit position can be easily returned to the raised position. Due thereto, for example, in a case in which the vehicle is made to travel in a state in which the hood is popped-up, the field of view at the vehicle front can be ensured.

In a vehicle pop-up hood device relating to a ninth aspect, in the fourth aspect, the displacement mechanism is made to be a surplus length portion that is formed at at least one of the first link and the second link, and, at a time of operation of the displacement mechanism, displacement toward the vehicle upper side at the other end portion of the connecting portion is permitted due to the surplus length portion plastically deforming.

In accordance with the above-described structure, due to the surplus length portion plastically deforming, the other end portion of the connecting portion is displaced from the raised position to the upper limit position, and displacement toward the vehicle upper side at the other end portion of the connecting portion is permitted. Due thereto, by a simple structure, the other end portion of the connecting portion can be displaced from the raised position to the upper limit position, and vibration energy of the hood can be absorbed.

In a vehicle pop-up hood device relating to a tenth aspect, in any one of the third through ninth aspects, the actuator is disposed at a vehicle transverse direction one side with respect to the first arm and the second arm, and the connecting portion is disposed at a vehicle transverse direction other side with respect to the first arm and the second arm.

In accordance with the above-described structure, compactness of the pop-up hood device in the vehicle transverse direction can be devised. Namely, if the actuator and the connecting portion were to be disposed at a vehicle transverse direction one side with respect to the first arm and the second arm, it would be necessary to prevent interference between the actuator and the connecting portion. Therefore, at the region at the vehicle transverse direction one side with respect to the first arm and the second arm, there would be the need to place the actuator and the connecting portion such that they were offset in the vehicle transverse direction. Due thereto, the dimension in the vehicle transverse direction of the vehicle pop-up hood device, that is structured to include the actuator and the connecting portion, would increase. In contrast, in accordance with the structure of the tenth aspect, the actuator and the connecting portion are disposed at the vehicle transverse direction one side and the vehicle transverse direction other side, respectively, with respect to the first arm and the second arm, and therefore, the actuator and the connecting portion can be disposed along the first arm and the second arm. Due thereto, compactness of the pop-up hood device in the vehicle transverse direction can be devised.

In a vehicle pop-up hood device relating to an eleventh aspect, in the tenth aspect, the hinge base is disposed at the vehicle transverse direction other side with respect to the connecting portion, a region of connection with the second arm at the second link is disposed adjacent to a region of connection of the actuator and the second arm, and an interconnection portion, that extends in a vehicle transverse direction and interconnects length direction both end portions of the first link, is formed at a length direction intermediate portion of the first link.

In accordance with the above-described structure, in the operation of the actuator, flexural deformation of the first arm and the second arm is suppressed by the connecting portion, and the second arm can be efficiently raised-up to the raised position by the actuator.

In a vehicle pop-up hood device relating to a twelfth aspect, in the third aspect, a stopper is provided at the connecting portion, and, in the operating state, pivoting of the first link and the second link toward a side opposite the stored state is limited by the stopper.

In accordance with the above-described structure, when the first link and the second link are pivoted and the connecting portion switches from the stored state to the operating state, overrunning of the first link and the second link that have reached the operating state (the first link and the second link pivoting further than the operating state) can be suppressed. Due thereto, in the operating state, stabilization of the connecting portion can be devised.

In a vehicle pop-up hood device relating to a thirteenth aspect, in the twelfth aspect, the other end portion of the second link is connected to the second arm by a connecting pin, and, given that a line, that passes-through an axial center of the connecting pin as seen in a side view and runs along a vehicle vertical direction, is made to be an imaginary reference line, in the stored state, the connecting shaft is disposed at a vehicle longitudinal direction one side with respect to the imaginary reference line, and, in the operating state, the connecting shaft is disposed at a vehicle longitudinal direction other side with respect to the imaginary reference line.

In accordance with the above-described structure, in the stored state, the connecting shaft is disposed at a vehicle longitudinal direction one side with respect to the imaginary reference line, and, in the operating state, the connecting shaft is disposed at the vehicle longitudinal direction other side with respect to the imaginary reference line. Therefore, in the operating state, when load toward the vehicle lower side acts on the other end portion of the connecting portion, the first link and the second link start to pivot in the direction of overrunning further than the position of the operating state. At this time, pivoting of the first link and the second link is limited by the stopper. Due thereto, the stopper can be made to function stably. As a result, the hood can be stably maintained at the raised position.

Advantageous Effects of Invention

As described above, in accordance with the vehicle pop-up hood device of the present disclosure, there is the excellent effect that the hood vibrating at the time of completion of popping-up can be suppressed.

BRIEF DESCRIPTION OF DRAWINGS

FIG. 6 is a side view that shows a state after operation of a displacement mechanism of a connecting portion at the vehicle pop-up hood device shown in FIG. 1.

DESCRIPTION OF EMBODIMENTS

First Embodiment

A vehicle pop-up hood device 20 (hereinafter called "PUH device 20") relating to a first embodiment is described by using FIG. 1 through FIG. 12. Note that arrow FR, arrow UP, arrow LH that are shown appropriately in the respective drawings indicate the forward direction (advancing direction), upward direction, leftward direction of a vehicle to which the PUH device 20 is applied, respectively. Hereinafter, when explanation is given by merely using longitudinal, vertical, left-right directions, they indicate the longitudinal of the vehicle longitudinal direction, the vertical of the vehicle vertical direction, the left and right of the vehicle left-right direction (the vehicle transverse direction), unless otherwise indicated.

Figure 8:
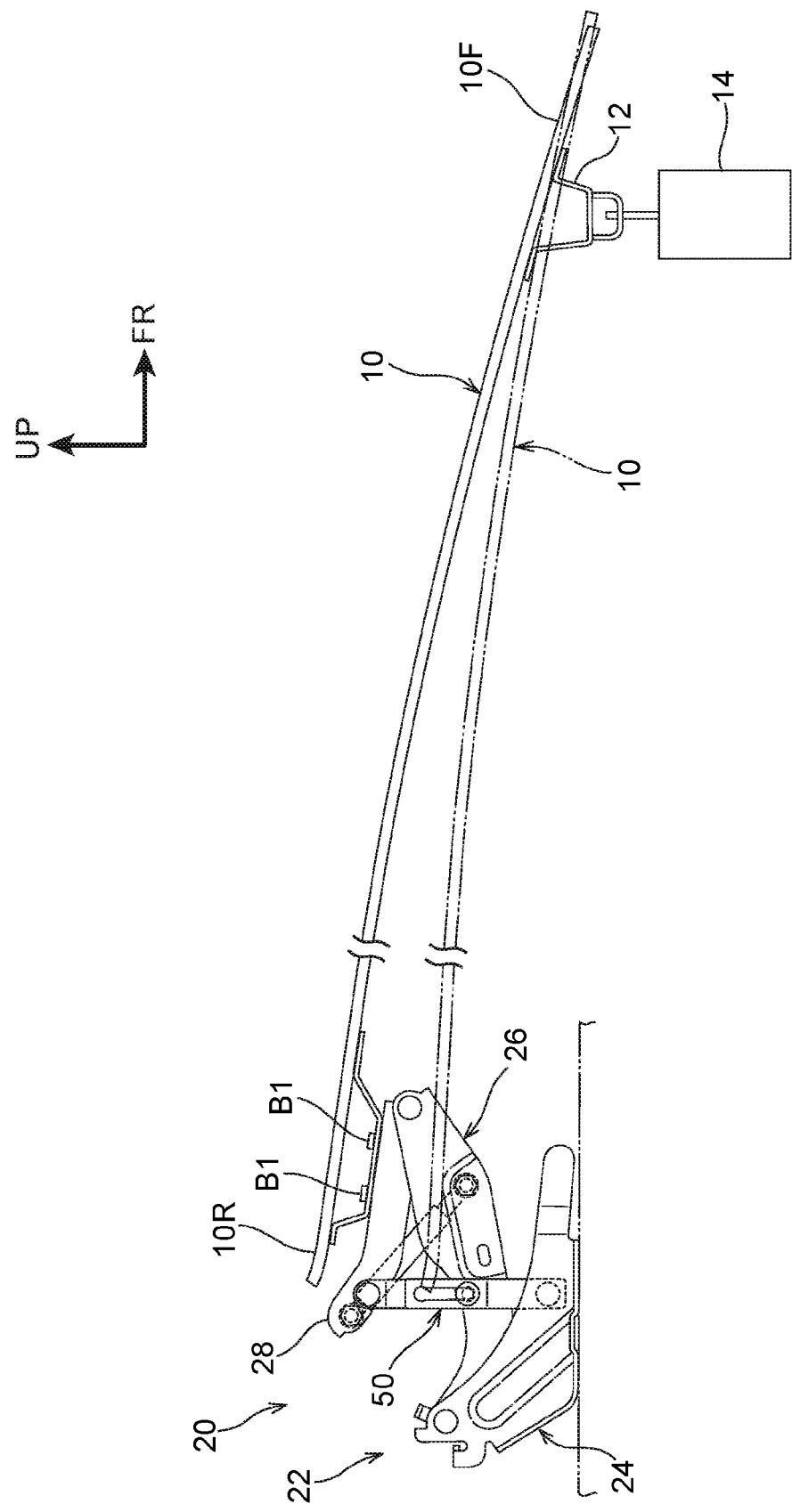
FIG. 8 is a schematic side view that is seen from the vehicle transverse direction central side and that shows a vehicle front portion to which the vehicle pop-up hood device of the first embodiment is applied.

As shown in FIG. 8, the PUH device 20 of the present embodiment is a hood hinge having a pop-up function, that has the function of popping-up (raising-up) a rear end portion 10R of a front hood 10 that serves as a "hood", from a closed position shown by the imaginary lines to a raised position shown by the solid lines. Hereinafter, the schematic structure of the front hood 10 will be described first, and then the PUH device 20 will be described.

(Structure of Front Hood 10)

The front hood 10 extends in the longitudinal direction and the vehicle transverse direction (left-right direction), and is formed in a substantially rectangular shape as seen in a vehicle plan view, and covers, from the upper side, a power unit room that houses an unillustrated power unit. Further, the rear end portion 10R of the front hood 10 is pivotably supported by a pair of the PUH devices 20 that are disposed with an interval therebetween in the vehicle transverse direction. In other words, the vehicle transverse direction both end portions at the rear end portion 10R of the front hood 10 are pivotably supported by the PUH devices 20. On the other hand, a hood striker 12 is fixed to the vehicle transverse direction intermediate portion of a front end portion 10F of the front hood 10. Further, the front hood 10 is held at the closed position (i.e., pivoting of the front hood 10 is restricted) due to the hood striker 12 being anchored on a single hood lock device 14 that is disposed at the vehicle transverse direction intermediate portion of the front end portion of the vehicle body.

(PUH Device 20)

The PUH devices 20 are respectively disposed at the vehicle transverse direction both end portions of the rear end portion 10R of the front hood 10, and are structured so as to be symmetrical to the left and the right. Therefore, in the following description, only the PUH device 20 that is disposed at the left side is described, and description of the PUH device 20 that is disposed at the right side is omitted.

As shown in FIG. 2 through FIG. 5, the PUH device 20 is structured to include a hood hinge 22 that supports the front hood 10 such that the front hood 10 can open and close, an actuator 30 that operates at the time of a collision between the vehicle and a pedestrian, and a connecting portion 50. Concrete description is given hereinafter.

(Regarding the Hood Hinge 22)

The hood hinge 22 is structured to include a hinge base 24 that is fixed to the vehicle body, a first arm 26 that is pivotably connected to the hinge base 24, and a second arm 28 that is pivotably connected to the first arm 26 and that is fixed to the rear end portion 10R of the front hood 10 via hinge bolts B1 (see FIG. 8).

The hinge base 24 is formed by carrying out press working or the like on a steel plate material, and is bent in a substantially backwards L-shape as seen in a vehicle front view seen from the front side. The lower end portion of the hinge base 24 is made to be a mounting wall portion 24-1, and the mounting wall portion 24-1 extends in the longitudinal direction with the substantially vertical direction being the plate thickness direction thereof. Further, a pair of mounting holes 24A (see FIG. 5) are formed so as to pass-through the mounting wall portion 24-1, and the mounting holes 24A are disposed with a predetermined interval therebetween in the longitudinal direction. Further, mounting bolts B2 (see FIG. 2 through FIG. 4) are inserted into the mounting holes 24A, and the mounting wall portion 24-1 is fixed to the vehicle body by the mounting bolts B2.

Further, the hinge base 24 has a side wall portion 24-2, and the side wall portion 24-2 extends toward the upper side from the vehicle transverse direction outer side end of the mounting wall portion 24-1. This side wall portion 24-2 is formed in a substantial V-shape that opens obliquely upward and frontward, as seen in a vehicle side view. Moreover, a bead portion 24B is formed at the hinge base 24, and the bead portion 24B extends from the vehicle transverse direction inner side end of the mounting wall portion 24-1 toward the vehicle transverse direction outer side, and extends from the lower end of the side wall portion 24-2 toward the upper side. Concretely, the bead portion 24B is structured to include a bead portion 24B-1 that is formed at the mounting wall portion 24-1 between the pair of mounting holes 24A, and a bead portion 24B-2 that is formed at the side wall portion 24-2.

The first arm 26 is formed by carrying out press-working or the like on a steel plate material, in the same way as the hinge base 24. This first arm 26 is disposed at the vehicle transverse direction outer side with respect to the hinge base 24 and such that the substantially vehicle transverse direction is the plate thickness direction thereof, and is formed in a substantially rectangular shape whose length direction is the longitudinal direction at the closed position of the front hood 10. A rear end portion 26R of the first arm 26 is pivotably connected to the upper end portion at the side wall portion 24-2 of the hinge base 24 by a first hinge pin HP1 whose axial direction is the vehicle transverse direction. Due thereto, the first arm 26 is structured so as to be able to pivot in the vertical direction (the arrow A direction and the arrow B direction in FIG. 2) relative to the hinge base 24 with the first hinge pin HP1 being the center of pivoting.

Further, a curved portion 26A (see FIG. 3 through FIG. 5) is formed at the longitudinal direction intermediate portion of the first arm 26, and the curved portion 26A is inclined toward the vehicle transverse direction outer side while heading toward the front side, as seen in a vehicle plan view. Due thereto, the front portion of the first arm 26 (the portion at the front side with respect to the curved portion 26A) is disposed further toward the vehicle transverse direction outer side than the rear portion of the first arm 26 (the portion at the vehicle rear side with respect to the curved portion 26A). Further, the portion (the area) between the front portion of the first arm 26 and the hinge base 24 is made to be connecting portion accommodating area CA (see FIG. 3) that accommodates the connecting portion 50 that is described later.

Moreover, a first bulging portion 26B (see FIG. 5) that bulges-out toward the vehicle transverse direction outer side is formed at the lower portion of the front portion of the first arm 26. A first weld bolt WB1 for mounting the actuator 30 that is described later is provided integrally with the front portion of this first bulging portion 26B, and the first weld bolt WB1 projects-out toward the vehicle transverse direction outer side from the first arm 26.

Further, a shear pin insert-through hole 26C through which an unillustrated shear pin is inserted is formed so as to pass-through the front portion of the first arm 26 at a position that is at the upper side with respect to the first bulging portion 26B.

The second arm 28 is formed by carrying out press-working or the like on a steel plate material, in the same way as the hinge base 24 and the first arm 26. The second arm 28 is disposed at the vehicle transverse direction outer side with respect to the first arm 26, and is bent in a substantially backward L-shape as seen in a front view. Concretely, the second arm 28 has a side wall portion 28-1 that is disposed substantially parallel to the first arm 26 and extends in the longitudinal direction. A front end portion 28F of this side wall portion 28-1 (second arm 28) is pivotably connected to a front end portion 26F of the first arm 26 by a second hinge pin HP2 whose axial direction is the vehicle transverse direction. Due thereto, the second arm 28 is structured so as to be able to pivot in the vertical direction (the arrow C direction and the arrow D direction in FIG. 2) relative to the first arm 26 with the second hinge pin HP2 being the center of pivoting.

A shear pin insert-through hole 28A (see FIG. 1) is formed so as to pass-through the side wall portion 28-1 of the second arm 28 at a position corresponding to the shear pin insert-through hole 26C of the above-described first arm 26. The unillustrated shear pin is fit into the interiors of the shear pin insert-through hole 26C of the first arm 26 and the shear pin insert-through hole 28A of the second arm 28, and the second arm 28 is joined to the first arm 26. Due thereto, in the non-operating state of the actuator 30 that is described later, relative pivoting of the second arm 28 with respect to the first arm 26 is limited.

Further, the second arm 28 has a top wall portion 28-2. The top wall portion 28-2 extends-out from the upper end of the side wall portion 28-1 toward the vehicle transverse direction outer side, and extends in the longitudinal direction along the front hood 10. A pair of mounting holes 28B (see FIG. 5) are formed so as to pass-through this top wall portion 28-2. Further, the hinge bolts B1 (see FIG. 8) are inserted from the lower side into these mounting holes 28B, and the top wall portion 28-2 is fastened (fixed) to the rear end portion 10R of the front hood 10. Due thereto, the hinge base 24 and the front hood 10 are connected by the first arm 26 and the second arm 28.

Moreover, a second weld bolt WB2 (in the broad sense, an element that can be understood to be a "mounting member for the actuator"), that is for mounting the actuator 30 that is described later, is provided integrally with a rear end portion 28R of the side wall portion 28-1 at the second arm 28. The head portion of this second weld bolt WB2 is disposed at the vehicle transverse direction inner side with respect to the side wall portion 28-1, and the second weld bolt WB2 projects-out toward the vehicle transverse direction outer side from the side wall portion 28-1.

Figure 9:
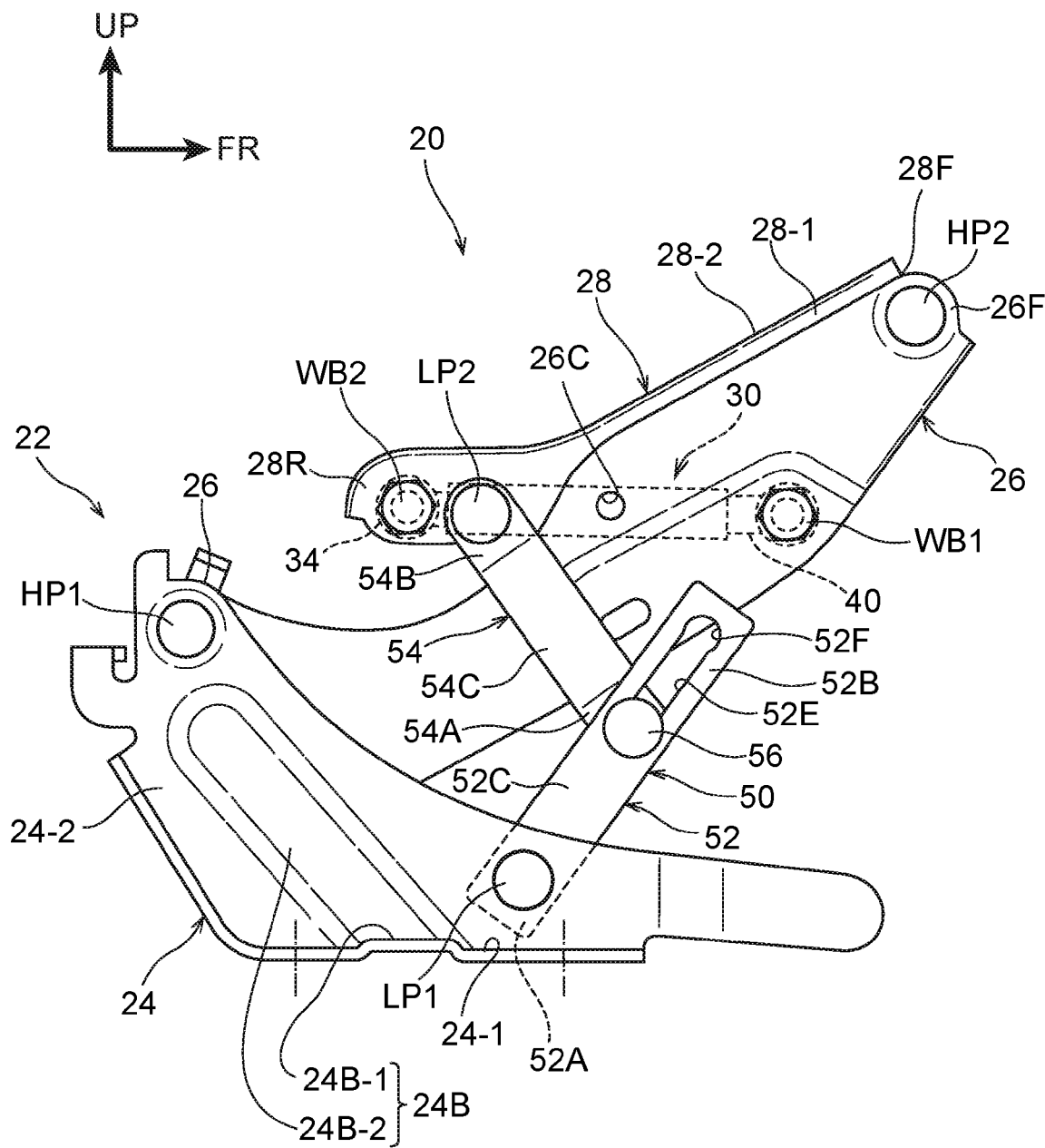
FIG. 9 is a side view that is seen from the vehicle transverse direction central side and that shows the state of the vehicle pop-up hood device at a time of usual opening/closing of a hood shown in FIG. 8.

Further, the hood hinge 22 that is structured as described above functions as a hinge part that pivotably supports the front hood 10. Namely, as shown in FIG. 9, at usual times of opening/closing the front hood 10, the front hood 10 is opened/closed due to the first arm 26 pivoting around the first hinge pin HP1 with respect to the hinge base 24 in a state in which relative pivoting of the first arm 26 and the second arm 28 is limited.

(Regarding the Actuator 30)

Figure 2:
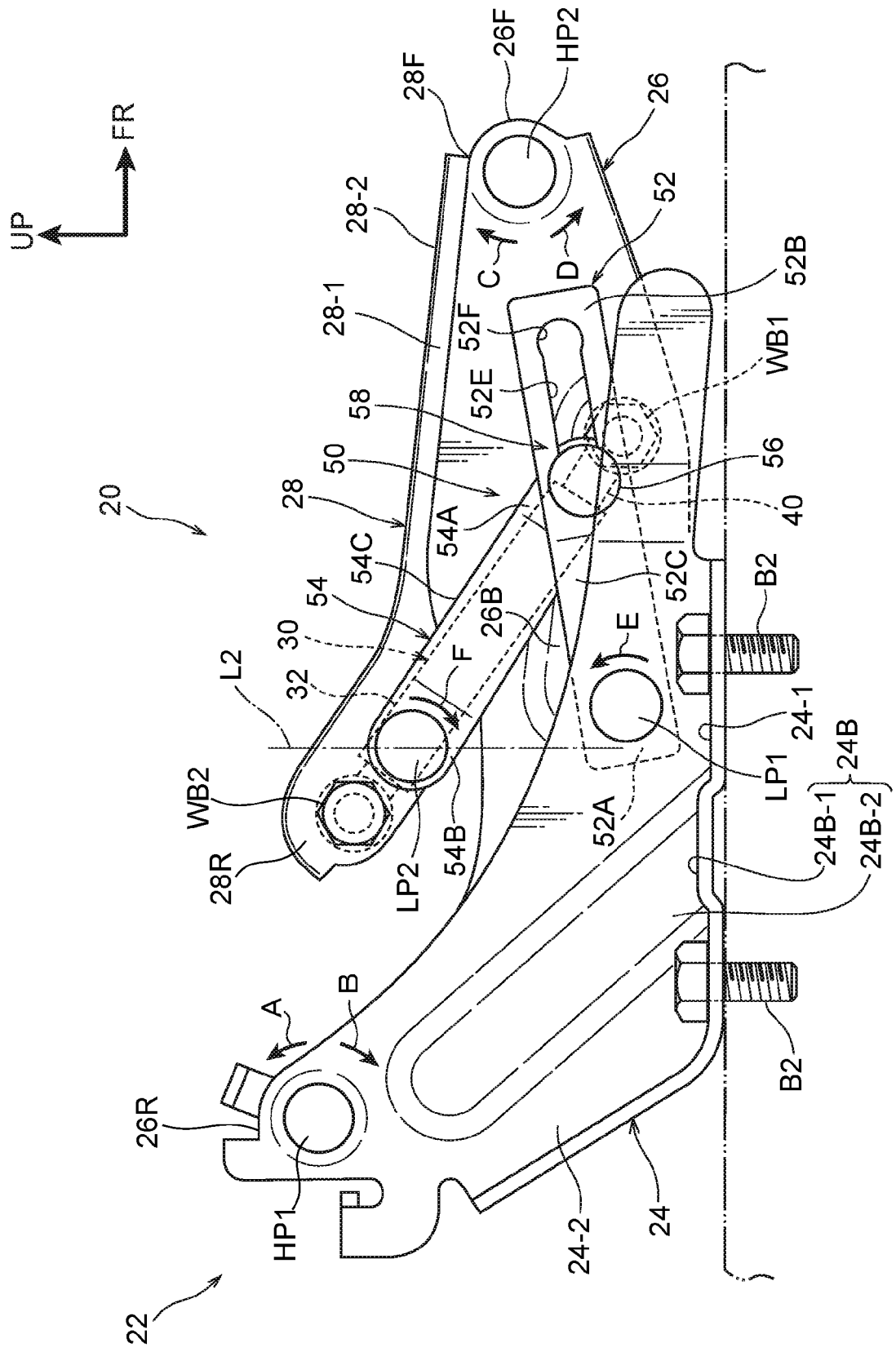
FIG. 2 is an enlarged side view that is seen from the vehicle transverse direction central side and that shows a state before operation of the vehicle pop-up hood device shown in FIG. 1.
Figure 3:
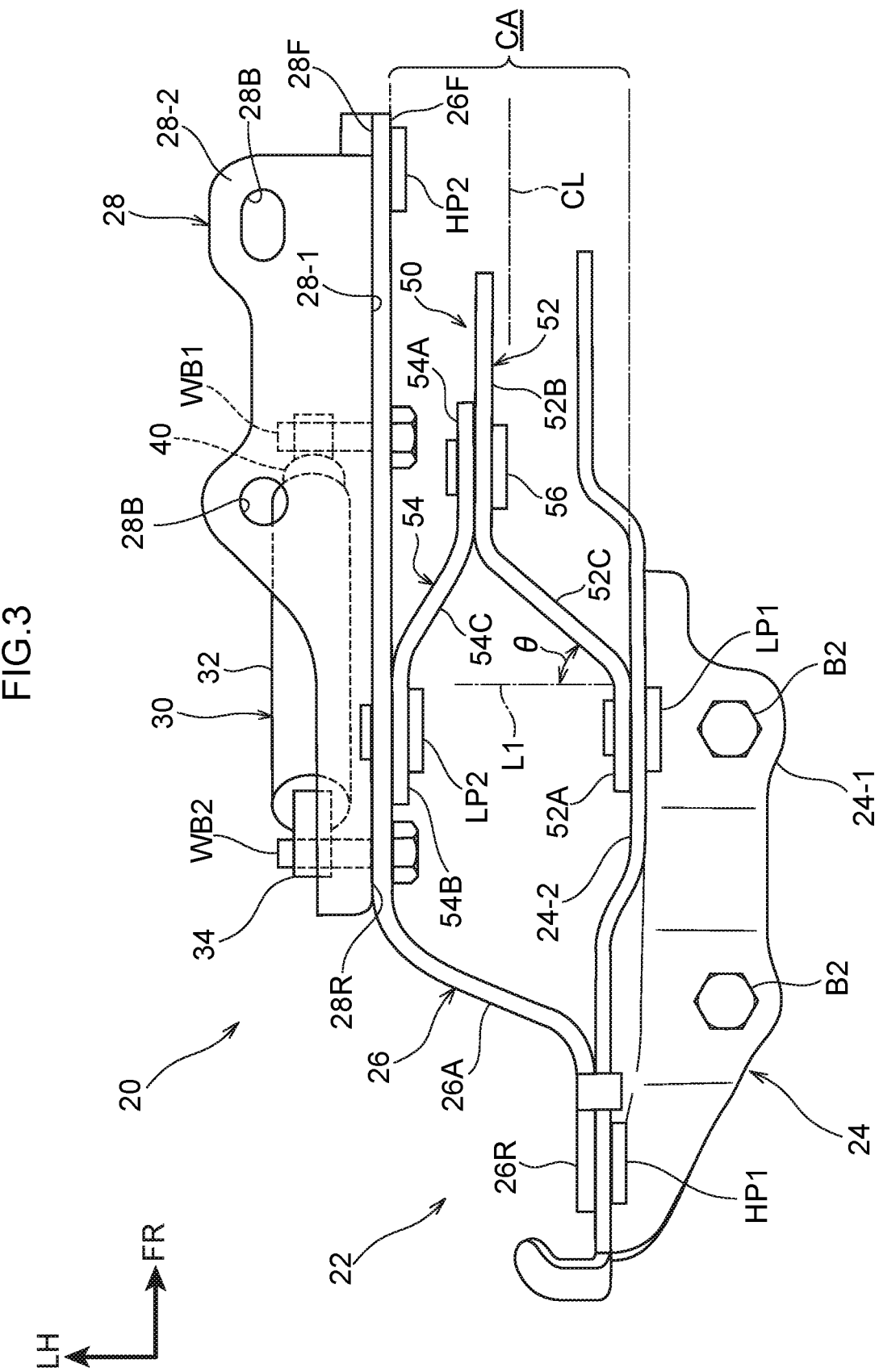
FIG. 3 is a plan view of the vehicle pop-up hood device shown in FIG. 2.
Figure 4:
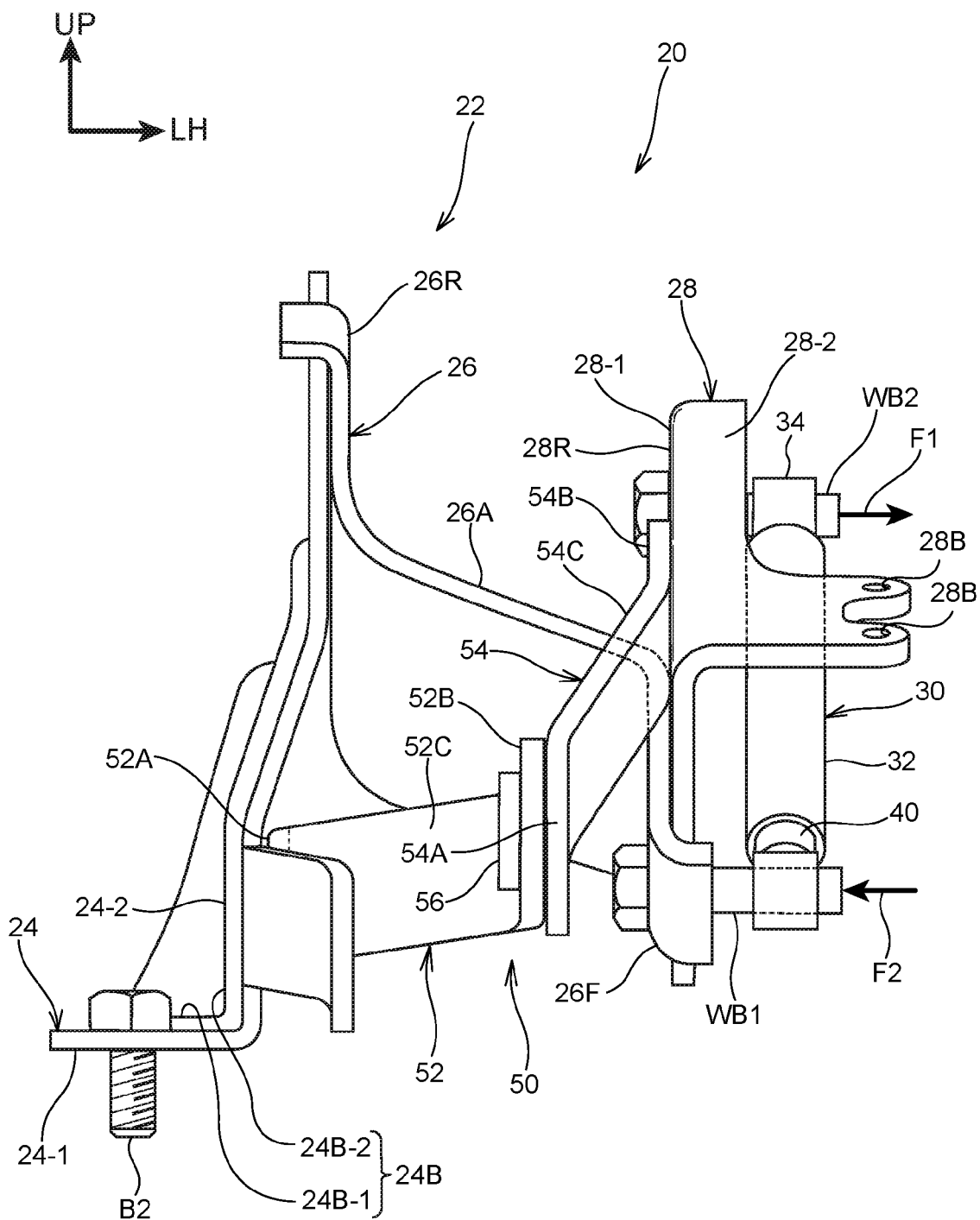
FIG. 4 is a front view of the vehicle pop-up hood device shown in FIG. 2.
Figure 10:
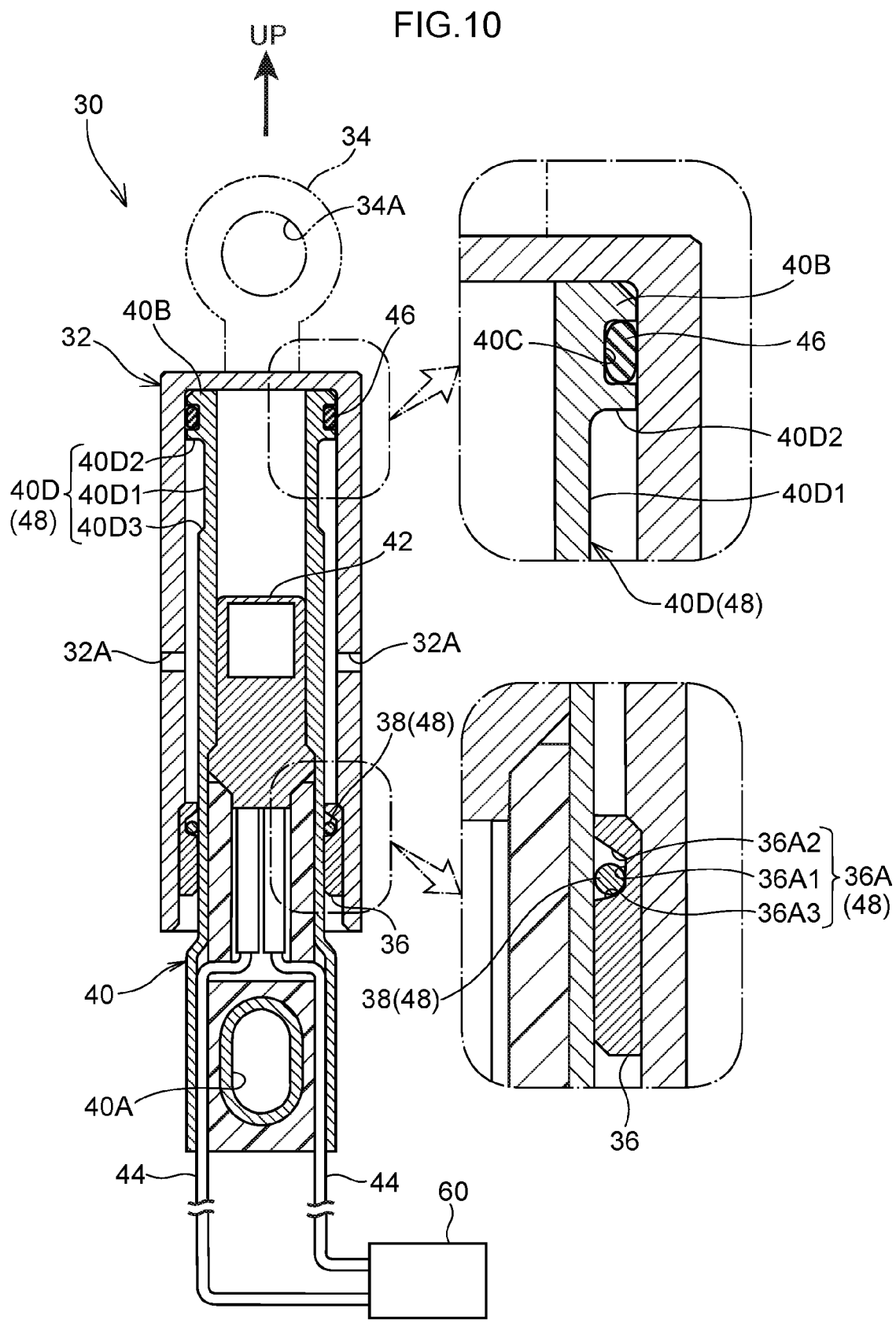
FIG. 10 is a cross-sectional view showing, in an enlarged manner, a state before operation of an actuator shown in FIG. 1.
Figure 11:
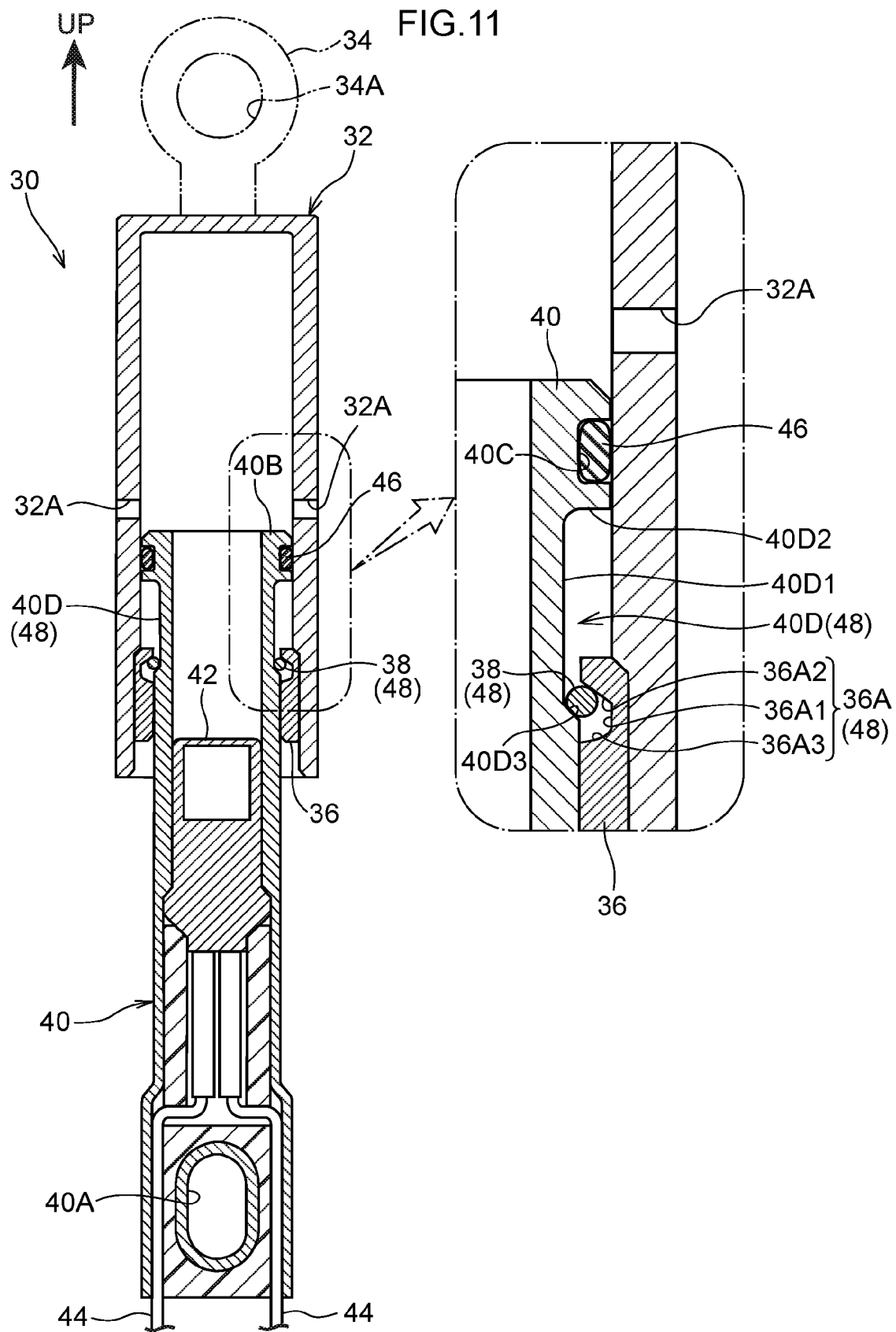
FIG. 11 is a cross-sectional view showing a state after operation of the actuator shown in FIG. 10.

As shown in FIG. 2 through FIG. 4, the actuator 30 is disposed at the vehicle transverse direction outer side of the second arm 28, and extends so as to span between the first weld bolt WB1 of the first arm 26 and the second weld bolt WB2 of the second arm 28. As shown in FIG. 10 and FIG. 11, this actuator 30 is structured to include a cylinder 32, a rod 40 and a holding mechanism 48.

The cylinder 32 is formed substantially in the shape of a cylindrical tube having a bottom that opens toward the lower side. An upper end side mounting portion 34 is provided integrally with the upper end portion of the cylinder 32, and a mounting hole 34A is formed so as to pass-through the upper end side mounting portion 34 in the vehicle transverse direction. Further, the second weld bolt WB2 of the above-described second arm 28 is inserted in the mounting hole 34A, and the upper end side mounting portion 34 is pivotably supported. Due thereto, the upper end portion of the cylinder 32 is mounted so as to be able to pivot relative to the second arm 28 (see FIG. 2 through FIG. 4).

On the other hand, a head portion 36 is provided at the inner peripheral portion of the lower end portion of the cylinder 32, and the head portion 36 is formed substantially in the shape of a cylindrical tube, and is fixed to the inner peripheral portion of the cylinder 32. An accommodating groove 36A that structures the holding mechanism 48 is formed at the inner peripheral portion of the head portion 36, and the accommodating groove 36A extends along the peripheral direction of the head portion 36 and is formed over the entire periphery of the head portion 36. Further, the accommodating groove 36A is formed in a substantial U-shape in cross-section that opens toward the radial direction inner side of the cylinder 32. Concretely, the accommodating groove 36A is structured to include a bottom surface 36A1 that is disposed along the axial direction of the cylinder 32 (the vertical direction) as seen in a vertical sectional view, an upper inclined surface 36A2 that is inclined toward the upper end side of the cylinder 32 while heading from the upper end of the bottom surface 36A1 toward the radial direction inner side of the cylinder 32, and a lower inclined surface 36A3 that is inclined slightly toward the lower end side of the cylinder 32 while heading from the lower end of the bottom surface 36A1 toward the radial direction inner side of the cylinder 32. Further, the border portion between the lower inclined surface 36A3 and the bottom surface 36A1 is smoothly connected in a circular arc-shape.

A lock ring 38 (in the broad sense, an element that can be understood to be a "holding member") that structures the holding mechanism 48 is disposed (accommodated) at the interior of the accommodating groove 36A. The lock ring 38 is structured by a wire that is made of metal and that is circular in cross-section, and is formed in an annular shape (a ring shape) at which a portion thereof is open. In other words, the lock ring 38 is formed in a substantial C-shape. Further, the lock ring 38 has spring properties, and is structured so as to be able to elastically deform in its own radial direction. Further, the lock ring 38 elastically deforms from its natural state (the state in which the lock ring 38 is not elastically deformed) toward the radial direction outer side, and is accommodated within the accommodating groove 36A in a state of being made to abut the outer peripheral portion of the rod 40 that is described hereinafter.

The rod 40 is formed in a substantially cylindrical tube shape, and is disposed coaxially with the cylinder 32, and the portion of the rod 40, except for the lower end portion thereof, is accommodated within the cylinder 32 so as to be able to move relatively thereto. Concretely, there is a structure in which, at the time when the cylinder 32 moves in the vertical direction relative to the rod 40 along the axis of the rod 40, the lock ring 38, together with the cylinder 32, moves relative to the rod 40, and the lock ring 38 slides on the outer peripheral surface of the rod 40. Namely, the lock ring 38 is structured so as to be able to move, together with the cylinder 32, relative to the rod 40.

Further, a mounting hole 40A is formed in the lower end portion of the rod 40 so as to pass-through in the vehicle transverse direction. Further, the first weld bolt WB1 of the first arm 26 is inserted within the mounting hole 40A, and the lower end portion of the rod 40 is pivotably supported. Namely, the lower end portion of the rod 40 is mounted so as to be able to pivot relative to the first arm 26 (see FIG. 2 through FIG. 4).

A micro gas generator 42 (hereinafter called "MGG 42") that is substantially cylindrical is fit-in in the length direction intermediate portion of the rod 40. The MGG 42 has a squib (ignition device), and a gas generating agent is filled within the MGG 42. Wire harnesses 44 are connected to the lower end of this MGG 42, and the MGG 42 is electrically connected to an ECU 60 (see FIG. 10) via the wire harnesses 44. Due thereto, the MGG 42 operates by control of the ECU 60. Further, when the MGG 42 operates, gas generated by the MGG 42 is supplied into the rod 40. Note that the wire harnesses 44 that extend-out from the lower end of the MGG 42 are bundled together at the interior of the rod 40, and are led-out from the lower end portion of the rod 40 to the outer side. Further, a resin material is filled into the interior of the rod 40, and the wire harnesses 44 and the rod 40 are made integral.

Moreover, a large diameter portion 40B, that is substantially annular and that projects-out toward the radial direction outer side, is formed at the upper end portion of the rod 40. The outer diameter dimension of the large diameter portion 40B is set to be slightly small as compared with the inner diameter dimension of the cylinder 32. A seal groove 40C is formed at the outer peripheral portion of this large diameter portion 40B. The seal groove 40C opens toward the radial direction outer side of the rod 40, and extends along the peripheral direction of the large diameter portion 40B, and is formed over the entire periphery of the large diameter portion 40B. Further, an O-ring 46 that is structured from a rubber material or the like is disposed within the seal groove 40C, and the region between the rod 40 and the cylinder 32 is sealed by the O-ring 46.

Further, a holding groove 40D that structures the holding mechanism 48 is formed in the outer peripheral portion of the rod 40 at a position that is at the lower end side of the rod 40 with respect to the large diameter portion 40B. The holding groove 40D opens toward the radial direction outer side of the rod 40, and extends along the peripheral direction of the rod 40, and is formed over the entire periphery of the rod 40. Concretely, the holding groove 40D is structured to include a bottom surface 40D1 that is disposed along the axial direction of the rod 40 (the vertical direction) as seen in a vertical sectional view, an upper surface 40D2 that extends from the upper end of the bottom surface 40D1 toward the radial direction outer side of the rod 40, and a lower inclined surface 40D3 that is inclined toward the lower end side of the rod 40 while heading from the lower end of the bottom surface 40D1 toward the radial direction outer side of the rod 40.

Further, when the MGG 42 operates, gas generated by the MGG 42 is supplied to the rod 40 interior, and, due to the gas pressure at the rod 40 interior, the cylinder 32 rises along the axial direction of the actuator 30. Due thereto, there is a structure in which the second arm 28 pivots from the position shown in FIG. 2 toward the upper side (in the arrow C direction in FIG. 2) relative to the first arm 26, and the front hood 10 is raised-up to its raised position (the position shown in FIG. 8). Note that, at this time, the first arm 26 is pivoted from the position shown in FIG. 2 toward the upper side (in the arrow A direction in FIG. 2) relative to the hinge base 24 (see FIG. 1).

Further, as shown in FIG. 10 and FIG. 11, plural (at two places in the present embodiment) gas vent holes 32A are formed in the lower end portion of the cylinder 32. In the non-operating state of the actuator 30 (the state shown in FIG. 10), these gas vent holes 32A are disposed at the lower end side of the actuator 30 with respect to the O-ring 46. Further, when the actuator 30 operates and the cylinder 32 rises to the raised position (the state shown in FIG. 11), the gas vent holes 32A are set so as to be disposed further toward the upper end side of the actuator 30 than the rod 40 (the O-ring 46). Due thereto, there is a structure in which, after the actuator 30 operates, the interior and the exterior of the cylinder 32 are communicated by the gas vent holes 32A, and the gas that has been supplied into the cylinder 32 (the rod 40) is discharged out (vented) from the gas vent holes 32A. As a result, there is a structure in which the raising of the actuator 30 with respect to the front hood 10 due to the gas pressure stops at the raised position of the front hood 10.

Moreover, as shown in FIG. 11, when the cylinder 32 rises to the raised position, the accommodating groove 36A of the cylinder 32 is set so as to be disposed at the radial direction outer side of the actuator 30 with respect to the lower end portion of the holding groove 40D of the rod 40. Namely, the accommodating groove 36A (the lock ring 38) and the lower end portion of the holding groove 40D are set so as to be disposed so as to face one another in the radial direction of the actuator 30. Further, at this time, due to the lock ring 38 elastically deforming toward the radial direction inner side (the diameter thereof contracting) and the lock ring 38 entering into the holding groove 40D, the lock ring 38 and the lower inclined surface 40D3 of the holding groove 40D are engaged. Moreover, at this time, the groove depth of the holding groove 40D and the wire diameter of the lock ring 38 are set such that a portion of the lock ring 38 projects-out further toward the radial direction outer side than the outer peripheral portion of the rod 40. Therefore, the lock ring 38 is nipped in the vertical direction by the upper inclined surface 36A2 of the accommodating groove 36A and the lower inclined surface 40D3 of the holding groove 40D, and the cylinder 32 is anchored on the lock ring 38 at the region of the accommodating groove 36A. Due thereto, withdrawing of the cylinder 32 is limited, and movement of the front hood 10, that is at the raised position, toward the lower side is limited by the holding mechanism 48.

Further, although details thereof are described later, there is a structure in which, due to the behavior of the front hood 10 that has been raised-up to the raised position, when a predetermined load toward the upper side is inputted to the upper end side mounting portion 34 of the cylinder 32, the cylinder 32 rises with respect to the rod 40 while the lock ring 38 slides on the bottom surface 40D1 of the holding groove 40D. Namely, at the actuator 30, the width dimension of the holding groove 40D (the vertical direction dimension of the bottom surface 40D1) is set such that the cylinder 32 (the lock ring 38) can rise further than the operation completed position shown in FIG. 11. Concretely, the width dimension of the holding groove 40D (the vertical direction dimension of the bottom surface 40D1) is set so as to correspond to the raised position and an upper limit position that is described later. In detail, the width dimension of the holding groove 40D is set so as to correspond to the distance between a connection hole 52D and a holding hole 52F of a first link 52 that is described later.

(Regarding the Connecting Portion 50)

As shown in FIG. 2 through FIG. 5, the connecting portion 50 is disposed between the hinge base 24 and the front portion of the first arm 26 (i.e., in the connecting portion accommodating area CA), and spans between the hinge base 24 and the second arm 28. In other words, the connecting portion 50 is disposed at the vehicle transverse direction inner side with respect to the front portion of the first arm 26 and the second arm 28. Further, the connecting portion 50 forms a link mechanism that is structured by the first link 52 and a second link 54, and has a displacement mechanism 58 at the connected region of the first link 52 and the second link 54. Further, at the closed position of the front hood 10, the connecting portion 50 is bent in a substantial V-shape that opens toward the rear side as seen in a side view (the state shown in FIG. 2, and hereinafter, this state is called the "stored state").

The first link 52 is structured by a plate material made of metal such as a steel plate or the like, and is formed substantially in the shape of an elongated plate. This first link 52 structures one end side portion (the lower side portion) of the connecting portion 50, and is disposed at the vehicle transverse direction outer side of the hinge base 24 with the vehicle transverse direction being the plate thickness direction thereof. Further, in the stored state, the first link 52 is disposed so as to be slightly inclined toward the upper side while heading toward the front side, as seen in a side view. Further, one end portion 52A of the first link 52 is pivotably connected to the lower end portion at the side wall portion 24-2 of the hinge base 24, by a first link pin LP1 whose axial direction is the vehicle transverse direction. Concretely, the first link pin LP1 is disposed at the longitudinal direction intermediate portion of the lower end portion of the side wall portion 24-2, and is set such that the first link pin LP1 and a portion of the mounting bolt B2, that is disposed at the rear side among the pair of mounting bolts B2 that mount the hinge base 24 to the vehicle body, overlap in the vertical direction as seen in a vehicle side view (see FIG. 2).

As shown in FIG. 3, a first link intermediate portion 52C is formed as an "interconnection portion" at the length direction intermediate portion of the first link 52, and the first link intermediate portion 52C extends in the vehicle transverse direction while inclining toward the vehicle transverse direction outer side while heading toward the length direction other side of the first link 52 (another end portion 52B side of the first link 52). Concretely, angle θ that is formed by reference line L1, that runs along the vehicle transverse direction as seen in a vehicle plan view, and the first link intermediate portion 52C is set to be less than or equal to 45°. Due thereto, at the first link 52, the other end portion 52B thereof is disposed so as to be offset toward the vehicle transverse direction outer side with respect to the one end portion 52A thereof. Further, because the first link intermediate portion 52C is inclined with respect to the reference line L1, the "interconnection portion (first link intermediate portion 52C) extends in the vehicle transverse direction" in the vehicle pop-up hood device of the present disclosure also includes cases in which the interconnection portion (first link intermediate portion 52C) extends at an incline with respect to the vehicle transverse direction.

Moreover, the other end portion 52B of the first link 52 is disposed further toward the vehicle transverse direction outer side than a central line CL in the transverse direction at the connecting portion accommodating area CA. Namely, the length of the first link intermediate portion 52C is set such that the other end portion 52B of the first link 52 is disposed at the first arm 26 and the second arm 28 side with respect to the central line CL.

Further, as shown in the partial enlarged view of FIG. 1, the connection hole 52D, that is circular and is for connecting the second link 54 that is described later, is formed so as to pass-through the other end portion 52B of the first link 52.

Further, a groove portion 52E that structures the displacement mechanism 58 is formed so as to pass-through the other end portion 52B of the first link 52 at the other end side of the first link 52 with respect to the connection hole 52D. This groove portion 52E extends along the length direction of the first link 52, and one end of the groove portion 52E communicates with the connection hole 52D. In other words, the groove portion 52E extends-out from the connection hole 52D toward the other end side of the first link 52. Further, the width dimension of the groove portion 52E is set to be smaller than the diameter dimension of the connection hole 52D, and is set to be constant along the length direction of the groove portion 52E. On the other hand, the holding hole 52F, that is circular and structures the displacement mechanism 58, is formed so as to pass-through the other end portion of the groove portion 52E. The diameter dimension of the holding hole 52F is set to be the same as the diameter dimension of the connection hole 52D.

As shown in FIG. 2 through FIG. 5, in the same way as the first link 52, the second link 54 is structured by a plate material made of metal such as a steel plate or the like, and is formed substantially in the shape of an elongated plate. The second link 54 structures the other end side portion (the upper side portion) of the connecting portion 50, and is disposed at the vehicle transverse direction outer side of the first link 52 with the vehicle transverse direction being the plate thickness direction thereof. Further, in the stored state of the connecting portion 50, the second link 54 is disposed so as to be inclined toward the lower side while heading toward the front side, as seen in a vehicle side view.

One end portion 54A of the second link 54 is disposed adjacent to the other end portion 52B of the first link 52 at the vehicle transverse direction outer side, and is pivotably connected to the other end portion 52B of the first link 52 by a connecting shaft 56 that structures the displacement mechanism 58 and whose axial direction is the vehicle transverse direction. Concretely, the connecting shaft 56 is fixed to the one end portion 54A of the second link 54, and a shaft portion 56A (refer to the partial enlarged view of FIG. 1) of the connecting shaft 56 projects-out from the one end portion 54A toward the vehicle transverse direction inner side, and is inserted-through the connection hole 52D. The shaft portion 56A of this connecting shaft 56 is formed in a substantially circular shape in cross-section, and the diameter dimension of the shaft portion 56A is set to be slightly smaller than the diameter dimension of the connection hole 52D, and is set to be slightly larger than the width dimension of the groove portion 52E. Due thereto, the connecting shaft 56 is pivotably supported at the connection hole 52D, and the one end portion 54A of the second link 54 is pivotably connected to the other end portion 52B of the first link 52.

Further, a second link intermediate portion 54C (see FIG. 3) is formed at the length direction intermediate portion of the second link 54, and the second link intermediate portion 54C is inclined toward the vehicle transverse direction inner side while heading toward the length direction other side of the second link 54 (another end portion 54B side of the second link 54). Due thereto, the other end portion 54B of the second link 54 is disposed so as to be offset toward the vehicle transverse direction outer side with respect to the one end portion 54A of the second link 54.

The other end portion 54B of the second link 54 is disposed adjacent to the vehicle transverse direction inner side of the side wall portion 28-1 of the second arm 28, and is pivotably connected to the rear end portion 28R of the second arm 28 (the side wall portion 28-1) by a second link pin LP2 that serves as a "connecting pin" and whose axial direction is the vehicle transverse direction. Concretely, in the stored state of the connecting portion 50, the other end portion 54B of the second link 54 is disposed adjacent to the front side with respect to the second weld bolt WB2. In further detail, the second link pin LP2 is disposed adjacent to the radial direction outer side of the second weld bolt WB2 (see FIG. 2).

Further, as shown in FIG. 2, in the stored state of the connecting portion 50, given that the imaginary line, that passes-through the axial center of the second link pin LP2 as seen in side view and that runs along the vertical direction, is imaginary reference line L2, the connecting shaft 56 is disposed at the front side with respect to the imaginary reference line L2. On the other hand, when the actuator 30 operates and the front hood 10 is raised-up to the raised position, the first link 52 pivots relative to the hinge base 24 (refer to arrow E in FIG. 2), and the second link 54 pivots relative to the second arm 28 (refer to arrow F in FIG. 2), and the connecting portion 50 is set so as to extend in a rectilinear form that runs substantially along the vertical direction (the state shown in FIG. 1 and FIG. 7A, and hereinafter, this state is called the "operating state").

Figure 1:
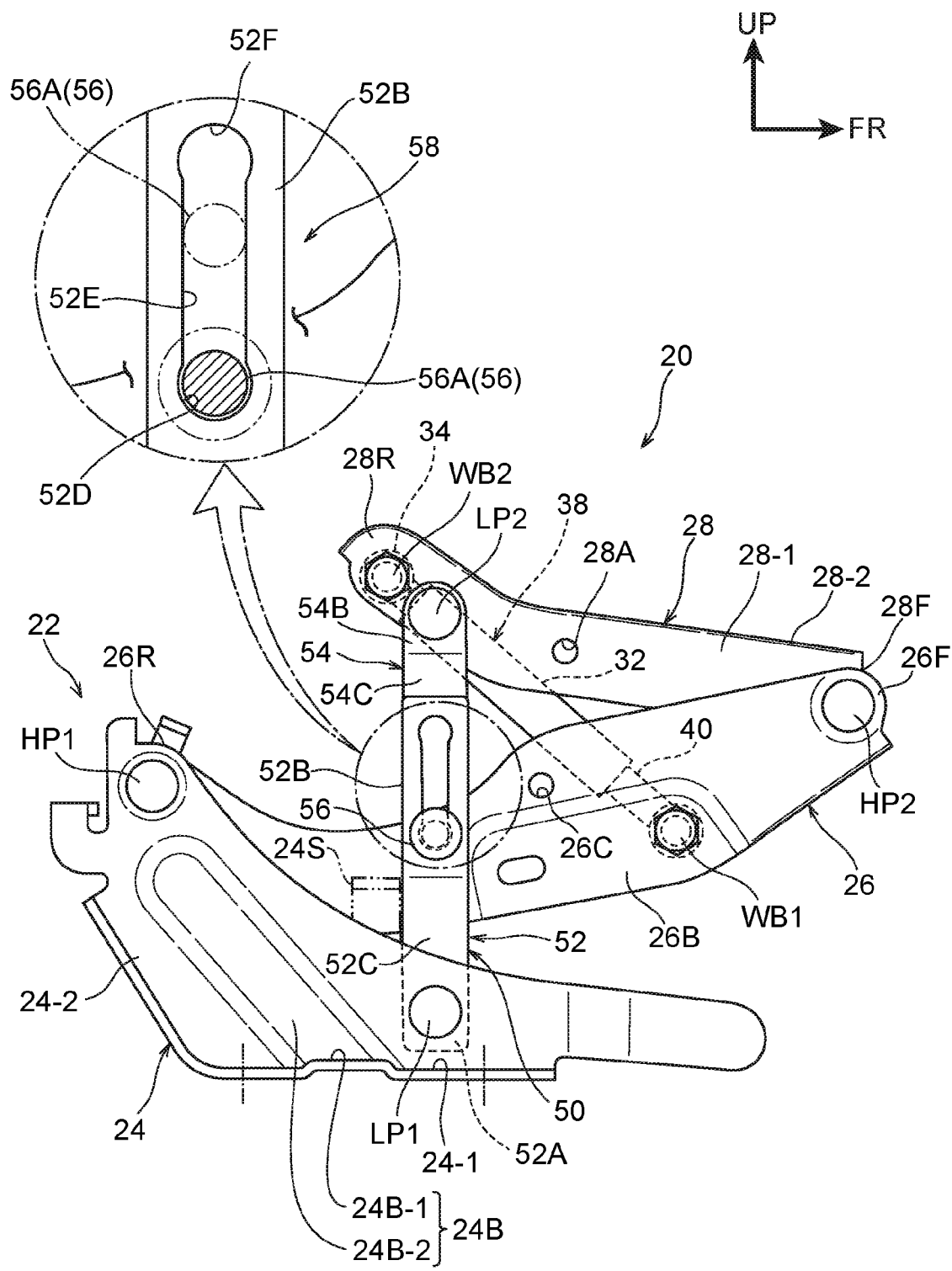
FIG. 1 is a side view that is seen from a vehicle transverse direction central side and that shows a state after operation of a vehicle pop-up hood device relating to a first embodiment.

Moreover, although details thereof are described later, in the operating state of the connecting portion 50 that is illustrated in FIG. 1, when a predetermined load toward the upper side is inputted to the other end portion of the connecting portion 50 (the other end portion 54B of the second link 54) due to the vibration that arises at the front hood 10 that has been raised-up to the raised position, the pivotally-supported state of the connecting shaft 56 by the connection hole 52D is cancelled, and the displacement mechanism 58 operates. Concretely, the connecting shaft 56 of the connecting portion 50 is structured so as to move toward the upper side within the groove portion 52E while widening the groove portion 52E toward the transverse direction outer side. Namely, at the time of operation of the displacement mechanism 58, the connecting shaft 56 moves toward the upper side along the groove portion 52E while sliding on the inner peripheral surface of the groove portion 52E (refer to the connecting shaft 56 shown by the two-dot chain line in the partial enlarged view of FIG. 1). Further, when the connecting shaft 56, that has moved along the groove portion 52E toward the upper side, reaches the holding hole 52F interior, operation of the displacement mechanism 58 is completed, and the connecting shaft 56 is held in the holding hole 52F (refer to FIG. 6 and FIG. 7B). Namely, when a predetermined load toward the upper side is inputted to the other end portion of the connecting portion 50 (the other end portion 54B of the second link 54) due to vibration that is generated at the front hood 10, the other end portion of the connecting portion 50 is displaced toward the upper side together with the front hood 10, and the front hood 10 is held at a position that is further toward the upper side than the raised position (the position shown in FIG. 6 and FIG. 7B, and hereinafter, this position is called the "upper limit position").

Note that the raised position of the front hood 10 is set to a predetermined height so as to ensure the performance of protecting a pedestrian who falls on the front hood 10 at the time of a collision between the vehicle and the pedestrian. Further, the upper limit position is set as follows in order to suppress vibration of the front hood 10 that has been raised-up to the raised position. Namely, although details thereof are described later, the front hood 10 that has been raised-up to the raised position vibrates in simple harmonic motion, and the upper limit is set such that the front hood 10 becomes substantially horizontal at the position where the vehicle transverse direction central portion of the front hood 10 reaches top dead center.

Further, as described above, at the time of usual opening/closing of the front hood 10, the first arm 26 pivots around the first hinge pin HP1 with respect to the hinge base 24. At this time, the first link 52 pivots relative to the hinge base 24, and the second link 54 pivots relative to the second arm 28, and the connecting portion 50 enters into the hood opening state that is shown in FIG. 9.

Operation and effects of the present embodiment are described next.

The state shown in FIG. 2 is the non-operating state of the PUH device 20. In this state, the first arm 26 and the second arm 28 are joined by the shear pin, and relative pivoting of the first arm 26 and the second arm 28 is limited. Further, at the time of opening/closing of the front hood 10, the front hood 10 is opened/closed (see FIG. 9) due to the first arm 26, together with the second arm 28, pivoting toward the upper side (the arrow A direction in FIG. 2) around the first hinge pin HP1 with respect to the hinge base 24.

On the other hand, when the vehicle front-collides with a collision body such as a pedestrian or the like at the closed position of the front hood 10, the fact that the vehicle has front-collided with a collision body is sensed by a collision sensing sensor (not shown), and a collision signal is outputted to the ECU 60. At the ECU 60, on the basis of the inputted collision signal, it is judged whether or not the PUH device 20 should be operated, and, if it is judged that the PUH device 20 should be operated, an operation signal is outputted from the ECU 60 to the actuator 30. Due thereto, the squib at the MGG 42 of the actuator 30 ignites, and gas is supplied into the rod 40 interior.

When gas is supplied into the rod 40 interior, the cylinder 32 is pushed by the gas pressure of the rod 40 interior, and the cylinder 32 rises in the axial direction of the rod 40. Due thereto, the cylinder 32 raises-up the rear end portion 28R of the second arm 28, and the vehicle transverse direction both end portions at the rear end portion 10R of the front hood 10 are raised-up to the raised position (refer to the front hood 10 shown by the solid line in FIG. 8). Note that, at this time, the shear pin that joins the second arm 28 and the first arm 26 breaks, and the second arm 28 pivots toward the upper side (the arrow C direction side in FIG. 2) relative to the first arm 26, and the first arm 26 pivots toward the upper side (the arrow A direction side in FIG. 2) relative to the hinge base 24. Due thereto, the front hood 10 is raised-up to the raised position. Further, at this time, the connecting portion 50 switches from the stored state to the operating state, and movement of the second arm 28 toward the upper side with respect to the hinge base 24 is restricted.

The relationship between the behavior of the front hood 10, and the state of the connecting portion 50 and the state of the actuator 30, at the time when the vehicle transverse direction both end portions at the rear end portion 10R of the front hood 10 are raised-up by the actuators 30 is described next by using FIG. 12. Note that, in FIG. 12, the state of the front hood 10, that is seen from the rear side at the time when the actuators 30 raise the front hood 10 up, is shown schematically in chronological order, and the vehicle transverse direction both end portions of the front hood 10 are shown by the white circles.

Figure 12:
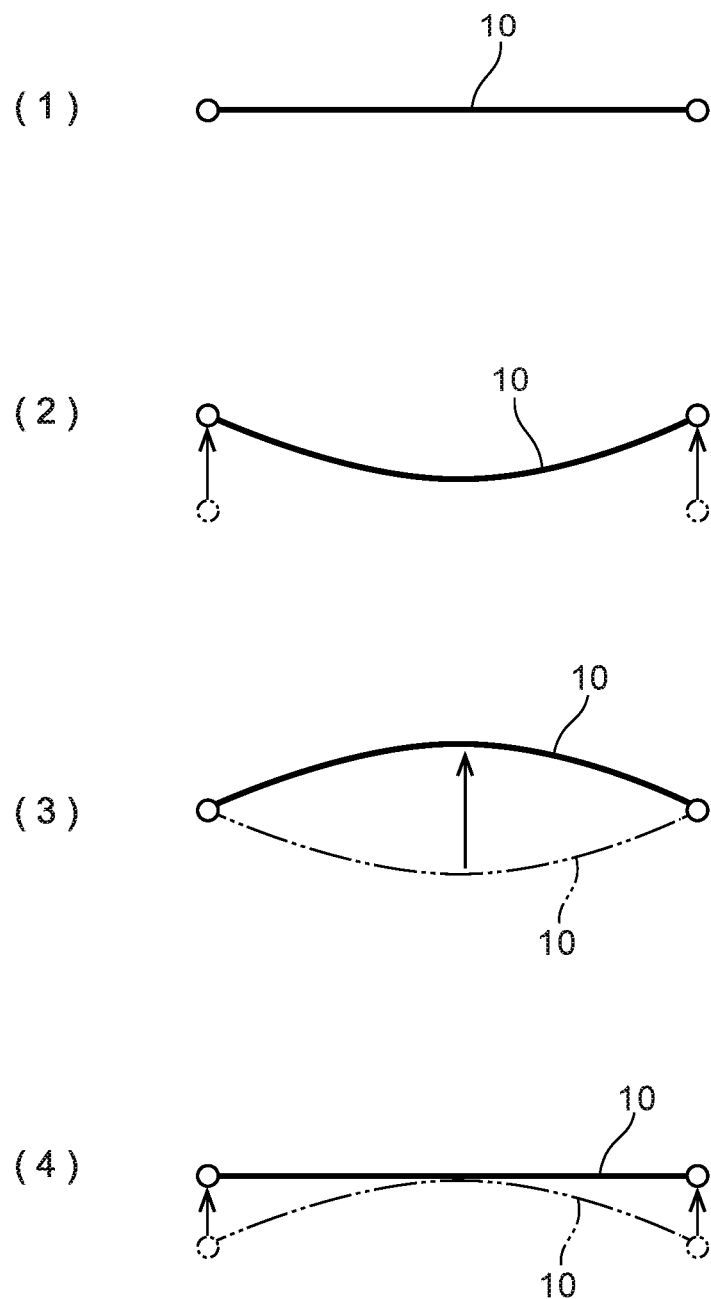
FIG. 12 is an explanatory drawing for explaining behavior of the hood in chronological order at the time when the vehicle pop-up hood device of the first embodiment operates.

(1) of FIG. 12 shows the state before the actuators 30 raise-up the front hood 10. In this state, the actuators 30 are in the non-operating state shown in FIG. 10, and the connecting portion 50 is in the stored state shown in FIG. 2.

Further, when operation of the actuator 30 starts, as shown in FIG. 11, the cylinder 32 rises instantaneously with respect to the rod 40, and the front hood 10 is raised-up to the raised position. At this time, the gas vent holes 32A of the cylinder 32 are disposed further toward the upper end side of the actuator 30 than the O-ring 46 of the rod 40. Therefore, gas at the interior of the rod 40 is discharged-out to the exterior of the actuator 30 from the gas vent holes 32A. Due thereto, the raising of the front hood 10 by the actuators 30 is stopped. Further, in this state, the lock ring 38, that rises together with the cylinder 32, is disposed between the lower end portion of the holding groove 40D of the rod 40 and the accommodating groove 36A of the cylinder 32.

Figure 5:
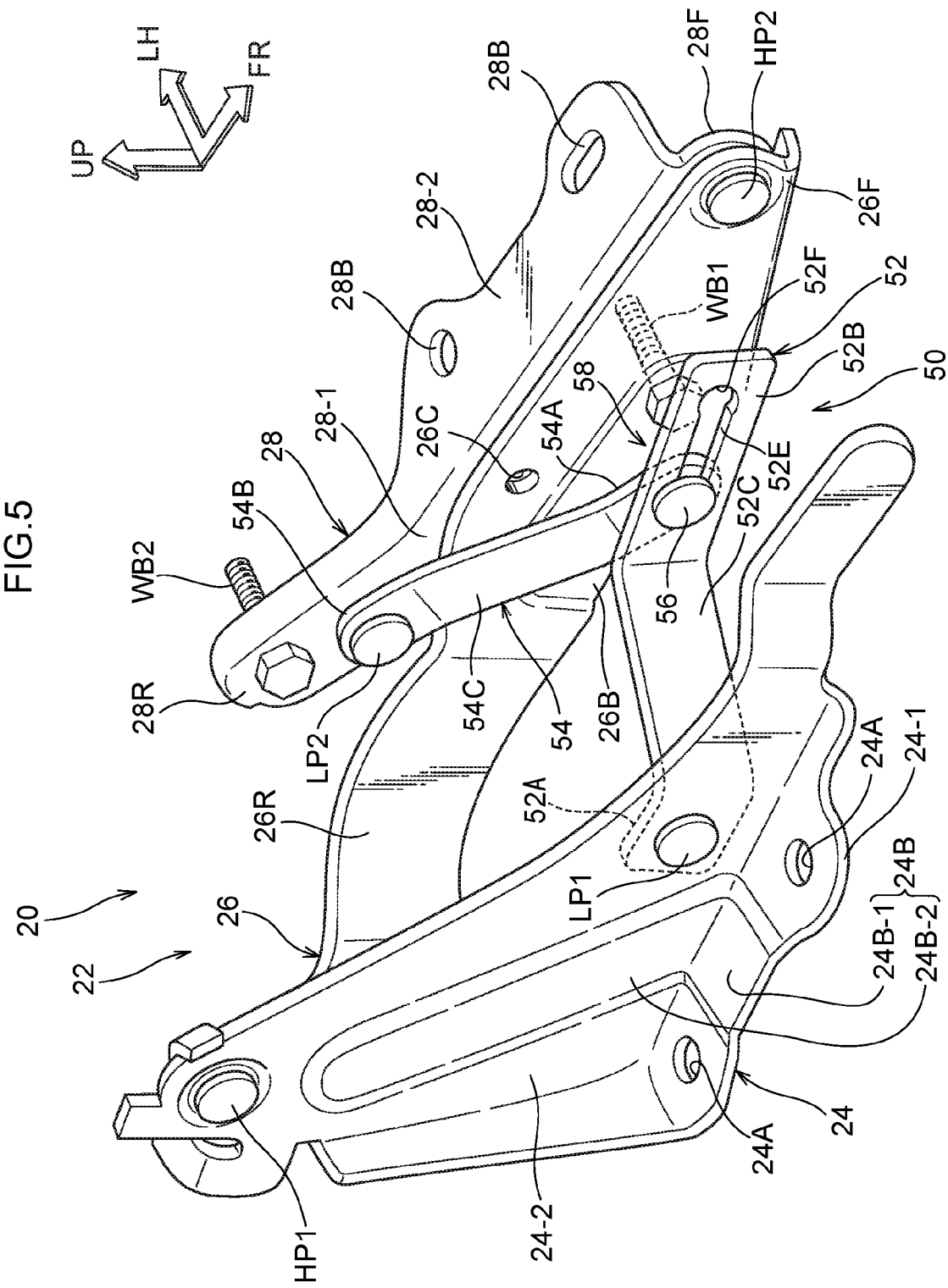
FIG. 5 is a perspective view of the vehicle pop-up hood device shown in FIG. 2.
Figure 7A:
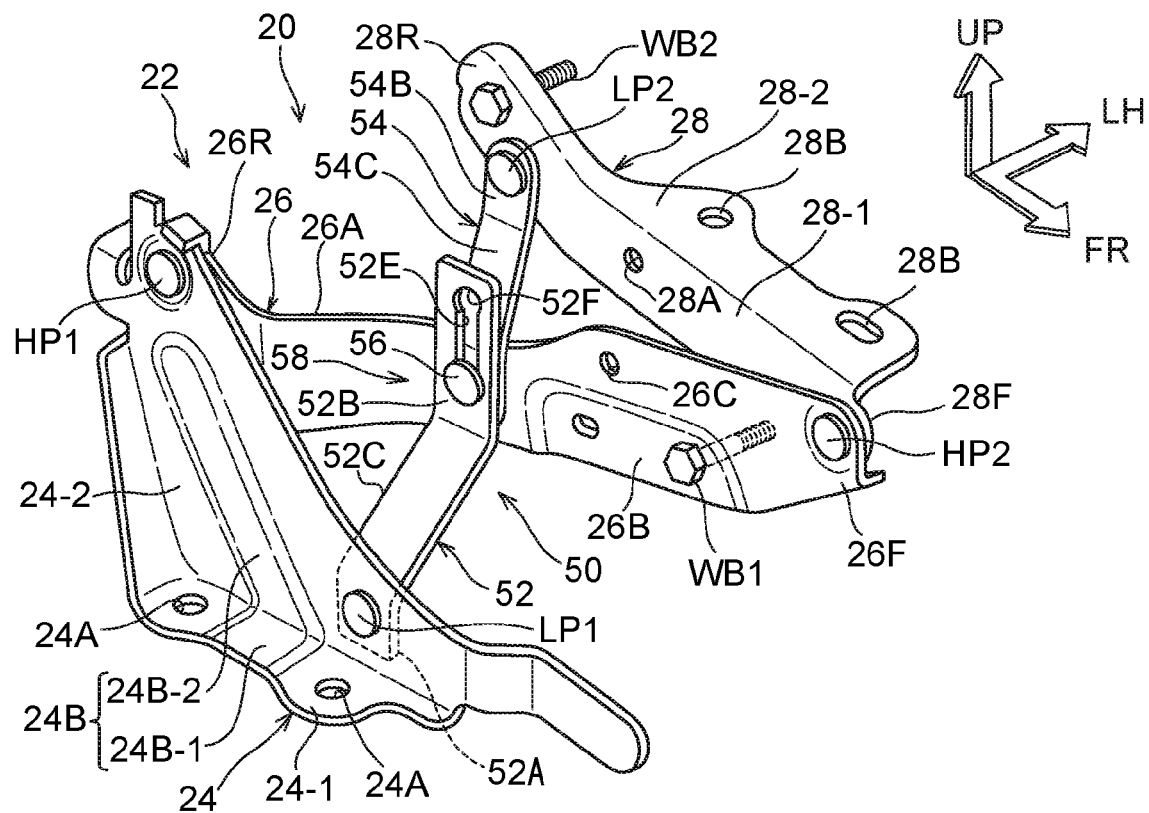
FIG. 7A is a perspective view of the vehicle pop-up hood device shown in FIG. 1.

When the actuator 30 operates and the front hood 10 is raised-up to the raised position, the connecting portion 50 switches from the stored state to the operating state (switches from the state shown in FIG. 2 and FIG. 5 to the state shown in FIG. 1 and FIG. 7A). Then, in the operating state of the connecting portion 50, the groove portion 52E of the displacement mechanism 58 is disposed so as to extend toward the upper side from the connection hole 52D. Note that, at the connecting portion 50, the diameter dimension of the shaft portion 56A of the connecting shaft 56, that connects the first link 52 and the second link 54, is set to be larger than the width dimension of the groove portion 52E, and therefore, in the operating state of the connecting portion 50, the connecting shaft 56 is held at the connection hole 52D interior. Namely, displacement of the second arm 28 toward the upper side with respect to the hinge base 24 is restricted by the connecting portion 50, and displacement, toward the upper side, of the vehicle transverse direction both end portions at the rear end portion 10R of the front hood 10 is restricted.

On the other hand, when the vehicle transverse direction both end portions at the rear end portion 10R of the front hood 10 are raised-up by the actuators 30, the vehicle transverse direction central portion of the front hood 10 tries to remain at that position due to inertial force. Therefore, in the initial stage of the raising-up of the front hood 10 by the actuators 30, only the vehicle transverse direction both end portions of the front hood 10 are raised-up (refer to the state of (2) in FIG. 12). Further, the vehicle transverse direction central portion of the front hood 10 is displaced toward the upper side later than the vehicle transverse direction both end portions of the front hood 10 (refer to the arrow shown in (3) of FIG. 12). Moreover, at the vehicle transverse direction central portion of the front hood 10, displacement in the vertical direction is not limited, and therefore, the vehicle transverse direction central portion of the front hood 10, that is displaced toward the upper side, is displaced further toward the upper side than the raised position (overshoots) due to inertial force (refer to the state of (3) of FIG. 12). Due thereto, at the time of raising the front hood 10, as seen from the rear side, the front hood 10 starts to vibrate in simple harmonic motion such that the vehicle transverse direction central portion of the front hood 10 is the antinode and the vehicle transverse direction both end portions of the front hood 10 are the nodes.

Further, when the vehicle transverse direction central portion of the front hood 10 overshoots further toward the upper side than the raised position, a predetermined load toward the upper side is applied from the front hood 10 via the second arms 28 to the other end portions of the connecting portions 50 (the other end portions 54B of the second links 54). Therefore, the displacement mechanisms 58 of the connecting portions 50 operate. Concretely, the pivotally-supported states of the connecting shafts 56 by the connection holes 52D are released, and the connecting shafts 56, while sliding on the inner peripheral surfaces of the groove portions 52E, move toward the upper side relative to the first links 52 (switch from the state shown in FIG. 1 and FIG. 7A to the state shown in FIG. 6 and FIG. 7B). Due thereto, the second arms 28 pivot toward the upper side with respect to the first arms 26 and are displaced toward the upper side with respect to the hinge bases 24, and the other end portions of the connecting portions 50 are displaced to the upper limit positions together with the vehicle transverse direction both end portions of the front hood 10.

To describe this in further detail by using FIG. 12, when the vehicle transverse direction central portion of the front hood 10 reaches top dead center or a vicinity of top dead center, the vehicle transverse direction both end portions of the front hood 10 are displaced to the upper limit position (from the state of (3) in FIG. 12 to the state of (4) in FIG. 12). As a result, the vehicle transverse direction both end portions of the front hood 10 are opened such that the front hood 10 becomes substantially horizontal as seen from the rear side. Accordingly, vibration of the front hood 10 that arises due to overshooting is damped at an early stage.

Figure 7B:
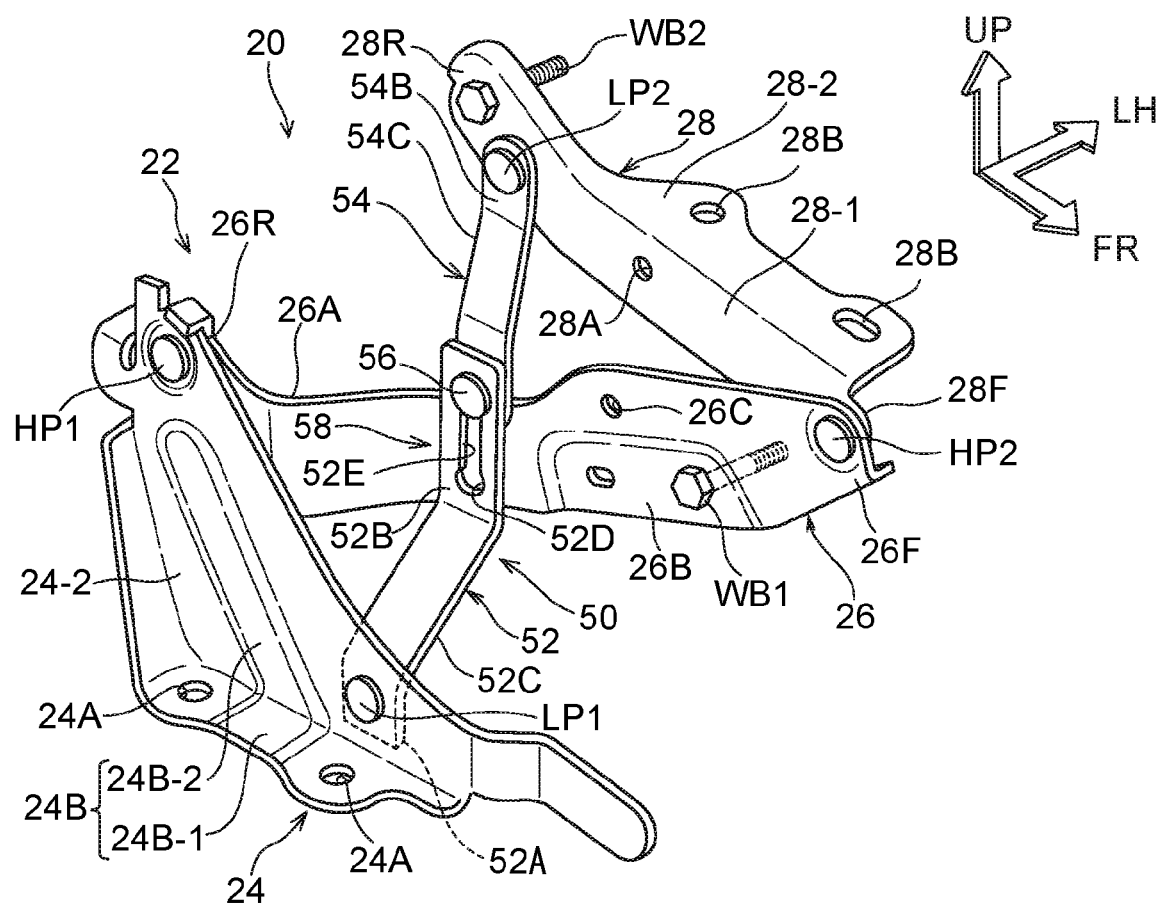
FIG. 7B is a perspective view of the vehicle pop-up hood device shown in FIG. 6.

Further, when the vehicle transverse direction both end portions of the front hood 10 are displaced to the upper limit position, the connecting shafts 56 of the connecting portions 50 are held within the holding grooves 40D (refer to FIG. 6 and FIG. 7B). Due thereto, the vehicle transverse direction both end portions of the front hood 10 are held at the upper limit position, in a state in which vibration of the front hood 10 is suppressed. Note that, when the other end portions of the connecting portions 50 are displaced from the raised position to the upper limit position, the cylinders 32 of the actuators 30 also rise further than the raised position with respect to the rods 40. Namely, the lock rings 38 move while sliding on the bottom surfaces 40D1 from the lower end portions of the holding grooves 40D toward the upper end portions (from the state shown in FIG. 11, the cylinders 32 rise further with respect to the rods 40).

As described above, in accordance with the PUH device 20, the second arm 28 that is fixed to the front hood 10 is connected to the hinge base 24 by the connecting portion 50. Further, when the actuator 30 operates and the front hood 10 is raised-up to the raised position, the connecting portion 50 switches from the stored state to the operating state, and movement (displacement) of the second arm 28 toward the upper side with respect to the hinge base 24 is restricted by the connecting portion 50. Namely, the second arm 28 is connected by the connecting portion 50 to the hinge base 24 that is fixed to a region of high rigidity at the vehicle body, and movement of the second arm 28 toward the upper side with respect to the hinge base 24 is restricted. Due thereto, shaking at the vehicle transverse direction both end portions of the front hood 10 at the time of completion of popping-up can be suppressed, as compared with a case in which the connecting portion 50 were to be omitted from the PUH device 20. Accordingly, vibration of the front hood 10 at the time of completion of popping-up can be suppressed.

Further, at the raised position, the hinge base 24 and the second arm 28 are connected by the connecting portion 50 that has switched to the operating state. Due thereto, at the time when a collided-with object abuts the front hood 10 that has popped-up, the front hood 10 withdrawing toward the rear side can be suppressed.

Further, the connecting portion 50 is structured as a link mechanism that has the first link 52 and the second link 54, and the first link 52 and the second link 54 are connected by the connecting shaft 56. Due thereto, the connecting portion 50 can be switched from the stored state to the operating state by a simple structure, in correspondence with the form of pivoting of the first arm 26 and the second arm 28.

Further, when the vehicle transverse direction central portion at the rear end portion 10R of the front hood 10 overshoots further toward the upper side than the raised position, and a predetermined load toward the upper side is applied from the front hood 10 to the other end portion of the connecting portion 50 (the second link 54), the displacement mechanism 58 that is structured by the connecting shaft 56 and the groove portion 52E operates. Due thereto, the vehicle transverse direction both end portions of the front hood 10 moving (being displaced) to the upper limit position, that is further toward the upper side than the raised position, is permitted. Accordingly, as described above, vibration of the front hood 10, that arises due to the vehicle transverse direction central portion overshooting toward the upper side, can be damped at an early stage.

Further, at the displacement mechanism 58 of the connecting portion 50, the diameter dimension of the shaft portion 56A of the connecting shaft 56 is set to be larger than the width dimension of the groove portion 52E. Therefore, at the time of operation of the displacement mechanism 58, (the shaft portion 56A of) the connecting shaft 56 moves from the connection hole 52D to the holding hole 52F while sliding on the inner peripheral surface of the groove portion 52E. Due thereto, at the time of operation of the displacement mechanism 58, vibration energy of the front hood 10 can be absorbed by the frictional force that arises between the connecting shaft 56 and the groove portion 52E. Accordingly, the vibration damping effect by the displacement mechanism 58 can be improved.

Further, the displacement mechanism 58 has the holding hole 52F that is formed at the other end portion of the groove portion 52E, and, at the upper limit position, the connecting shaft 56 is held by the holding hole 52F. Therefore, the front hood 10 can be held at the upper limit position in a state in which vibration of the front hood 10 is suppressed.

Further, at the PUH device 20, the actuator 30 is disposed at the vehicle transverse direction outer side (the one side) with respect to the first arm 26 and the second arm 28, and the connecting portion 50 is disposed at the vehicle transverse direction inner side (the other side) with respect to (the front portion of) the first arm 26 and the second arm 28. Due thereto, compactness of the PUH device 20 in the vehicle transverse direction can be devised.

Namely, if the actuator 30 and the connecting portion 50 were to be disposed at the vehicle transverse direction outer side or inner side with respect to the first arm 26 and the second arm 28, it would be necessary to prevent interference between the actuator 30 and the connecting portion 50. Therefore, at the region at the vehicle transverse direction outer side or inner side with respect to the first arm 26 and the second arm 28, there would be the need to place the actuator 30 and the connecting portion 50 such that they were offset in the vehicle transverse direction. Due thereto, the dimension in the vehicle transverse direction of the PUH device 20, that is structured to include the actuator 30 and the connecting portion 50, would increase. On the other hand, at the PUH device 20 of the present disclosure, as described above, the actuator 30 is disposed at the vehicle transverse direction outer side (the one side) with respect to the first arm 26 and the second arm 28, and the connecting portion 50 is disposed at the vehicle transverse direction inner side (the other side) with respect to (the front portion of) the first arm 26 and the second arm 28. Therefore, the actuator 30 and the connecting portion 50 can be disposed along the front portion of the first arm 26 and the second arm 28. Due thereto, compactness of the PUH device 20 in the vehicle transverse direction can be devised.

Moreover, at the connecting portion 50, the other end portion 54B of the second link 54 is connected to the second arm 28, and is disposed adjacent to the second weld bolt WB2 that connects the actuator 30 to the second arm 28. Further, the first link intermediate portion 52C that extends in the vehicle transverse direction is formed at the length direction intermediate portion of the first link 52. Therefore, the front hood 10 can be raised efficiently by the actuator 30. This point is described hereinafter.

Namely, in the initial stage of the raising of the front hood 10, raising force toward the upper side is applied from the upper end portion of the actuator 30 to the rear end portion 28R of the second arm 28, and reaction force toward the lower side due to the raising-up is applied from the lower end portion of the actuator 30 to the lower end portion of the first arm 26 (in detail, the first weld bolt WB1 (the first bulging portion 26B)). Further, the actuator 30 is disposed at the vehicle transverse direction outer side of the second arm 28, and the first arm 26 is disposed at the vehicle transverse direction inner side with respect to the second arm 28. Therefore, in the initial stage of operation of the actuator 30, the actuator 30 has the tendency to tilt as seen in a vehicle front view. Concretely, there is the tendency for load toward the vehicle transverse direction outer side (refer to arrow F1 in FIG. 4) to be applied from the actuator 30 to the rear end portion 28R of the second arm 28, and load toward the vehicle transverse direction inner side (refer to arrow F2 in FIG. 4) to be applied from the actuator 30 to the lower end portion at the front portion of the first arm 26. Due thereto, the rear end portion 28R of the second arm 28 starts to flexurally deform toward the vehicle transverse direction outer side, and the front portion of the first arm 26 starts to flexurally deform toward the vehicle transverse direction inner side.

Here, the other end portion 54B of the second link 54 is connected to the second arm 28, and is disposed adjacent to the second weld bolt WB2 that connects the actuator 30 to the second arm 28. Therefore, flexural deformation toward the vehicle transverse direction outer side at the rear end portion 28R of the second arm 28 is suppressed by the connecting portion 50 that is connected to the hinge base 24.

Further, the first link intermediate portion 52C that extends in the vehicle transverse direction is formed at the length direction intermediate portion of the first link 52. Therefore, when load toward the vehicle transverse direction inner side is applied to the front portion of the first arm 26, the load is applied such that the first link intermediate portion 52C that is connected to the hinge base 24 braces against the first arm 26. Due thereto, flexural deformation toward the vehicle transverse direction inner side at the front portion of the first arm 26 is suppressed. Due to the above, flexural deformation of the first arm 26 and the second arm 28 at the time of operation of the actuator 30 is suppressed. Accordingly, the raising force of the actuator 30 at the time of operation can be applied efficiently to the second arm 28 (the front hood 10). As a result, the front hood 10 can be raised efficiently by the actuator 30.

Moreover, the other end portion 52B of the first link 52 is disposed further toward the vehicle transverse direction outer side (the first arm 26 and the second arm 28 side) than the central line CL in the transverse direction at the connecting portion accommodating area CA. Therefore, the extended length of the first link intermediate portion 52C in the vehicle transverse direction can be set to be long as compared with a case in which the other end portion 52B of the first link 52 were to be disposed in a vicinity of the central line CL. Due thereto, flexural deformation of the first arm 26 at the time of operation of the actuator 30 can be effectively suppressed. Namely, at the time of operation of the connecting portion 50, the first link 52 and the second link 54 are respectively pivoted, and therefore, when considering the pivoting balance of the first link 52 and the second link 54, it is desirable to place the other end portion 52B of the first link 52 and the one end portion 54A of the second link 54 in a vicinity of the central line CL. In other words, it is desirable to set the lengths of the first link intermediate portion 52C and the second link intermediate portion 54C in the vehicle transverse direction to be the same. However, when the lengths of the first link intermediate portion 52C and the second link intermediate portion 54C in the vehicle transverse direction are set to be the same, the effect of working such that the first link intermediate portion 52C braces against the first arm 26 is reduced. In contrast, by disposing the other end portion 52B of the first link 52 further toward the vehicle transverse direction outer side than the central line CL in the transverse direction at the connecting portion accommodating area CA, the extended length of the first link intermediate portion 52C in the vehicle transverse direction can be set to be relatively long. Due thereto, flexural deformation of the first arm 26 at the time of operation of the actuator 30 can be suppressed effectively.

Further, the first link pin LP1, that connects the one end portion 52A of the first link 52 to the hinge base 24, is disposed at the longitudinal direction intermediate portion of the lower end portion of the side wall portion 24-2 at the hinge base 24. Moreover, a portion of the mounting bolt B2, that mounts the hinge base 24 to the vehicle body, and the first link pin LP1 are set so as to overlap in the vertical direction as seen in a vehicle side view. Therefore, the one end portion 52A of the first link 52 can be disposed in a vicinity of the mounting bolt B2. Due thereto, the one end portion 52A of the first link 52 can be connected to a region that has high supporting rigidity at the hinge base 24.

Note that, in the first embodiment, the width dimension of the groove portion 52E is set to be constant along the length direction of the groove portion 52E. In other words, at the displacement mechanism 58, the sliding resistance of the connecting shaft 56 with respect to the groove portion 52E at the time when the connecting shaft 56 moves from one end of the groove portion 52E to the other end, and the sliding resistance of the connecting shaft 56 with respect to the groove portion 52E at the time when the connecting shaft 56 moves from the other end of the groove portion 52E to the one end, are set to be substantially the same. Instead, there may be a structure in which the sliding resistance of the connecting shaft 56 with respect to the groove portion 52E at the time when the connecting shaft 56 moves from the other end of the groove portion 52E to the one end is lower (smaller) than the sliding resistance of the connecting shaft 56 with respect to the groove portion 52E at the time when the connecting shaft 56 moves from the one end of the groove portion 52E to the other end.

Figure 14A:
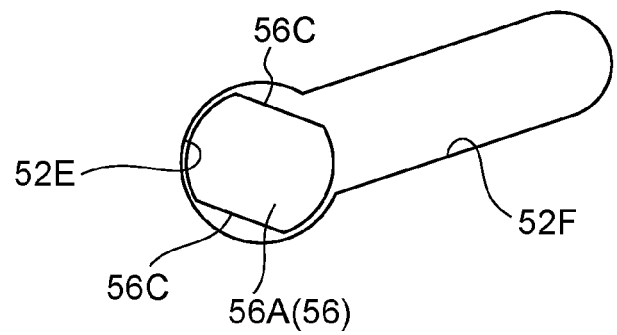
FIG. 14A is an enlarged side view showing a modified example of a connecting shaft shown in FIG. 1, in a stored state of the connecting portion.
Figure 14B:
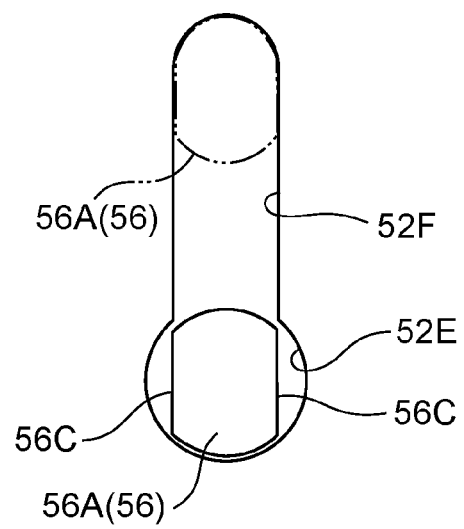
FIG. 14B is a side view showing the modified example of the connecting shaft shown in FIG. 14A, in an operating state of the connecting portion.
Figure 14C:
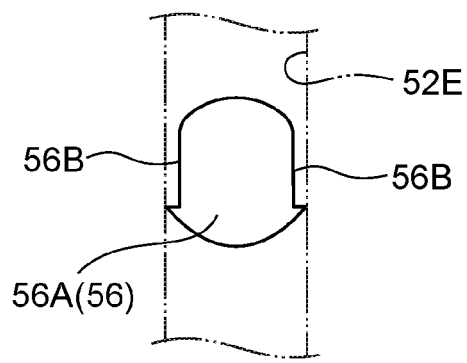
FIG. 14C is an enlarged side view showing another example of a modified example of the connecting shaft shown in FIG. 1, in a state in which the connecting shaft is disposed within a groove portion.

For example, the width dimension of the groove portion 52E may be set so as to become smaller while heading from the one end of the groove portion 52E toward the other end (while heading upward). Further, for example, as shown in FIG. 14C, there may be a structure in which a pair of cut-out portions 56B that are cut-out in substantial L-shapes are formed in the outer peripheral portion of the shaft portion 56A of the connecting shaft 56, and the sliding resistance of the connecting shaft 56 with respect to the groove portion 52E at the time when the connecting shaft 56 moves from the other end of the groove portion 52E to the one end is small. In this case, the cut-out portions 56B are set so as to be disposed at the other end side of the groove portion 52E with respect to the axial center of the connecting shaft 56 at the time when the connecting portion 50 switches to the operating state. Accordingly, by setting in these ways, the front hood 10 that is disposed at the upper limit position can easily be returned to the raised position. As a result, for example, in a case in which the vehicle is made to travel in a state in which the front hood 10 is popped-up, the field of view at the vehicle front side for the driver can be ensured by returning the front hood 10 from the upper limit position to the raised position.

Moreover, in a case in which the sliding resistance of the connecting shaft 56 with respect to the groove portion 52E at the time when the connecting shaft 56 moves from the other end of the groove portion 52E to the one end is made to be small, for example, there may be a structure in which the front hood 10 returns from the upper limit position to the raised position due to the weight of the front hood 10 itself. In this case, the front hood 10, that is in a state in which vibration is suppressed at the upper limit position, can be displaced from the upper limit position to the raised position by its own weight.

Figure 13A:
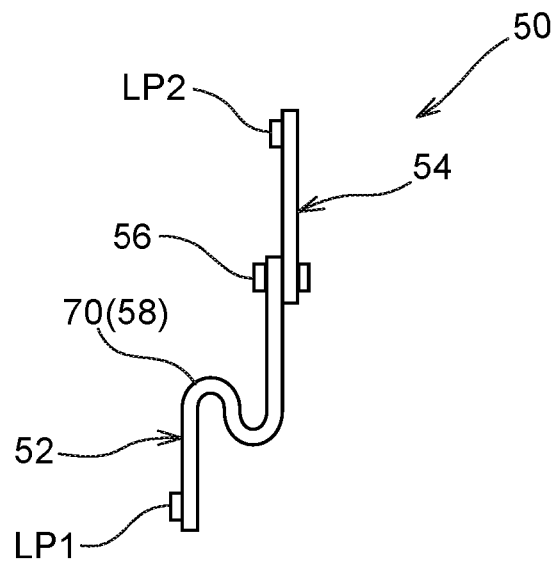
FIG. 13A is a schematic drawing showing a modified example of the displacement mechanism at the connecting portion shown in FIG. 1.
Figure 13B:
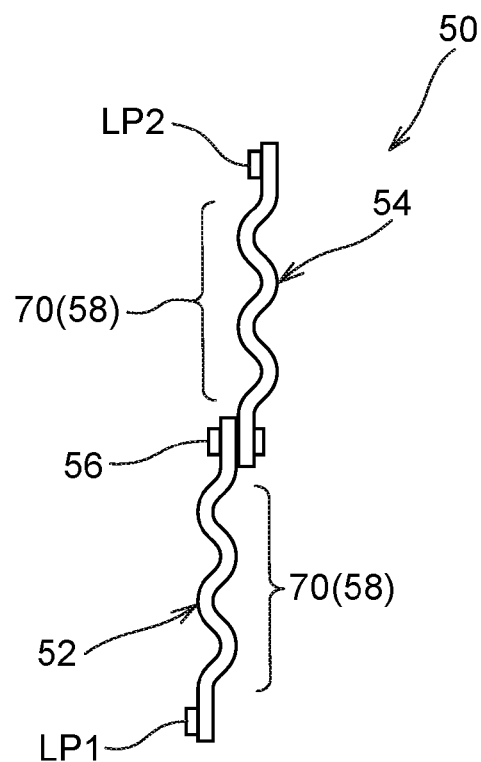
FIG. 13B is a schematic drawing showing another example of a modified example of the displacement mechanism at the connecting portion shown in FIG. 1.

Further, in the first embodiment, the other end portion of the connecting portion 50 is displaced toward the upper side by the displacement mechanism 58 of the connecting portion 50, and the connecting shaft 56 of the displacement mechanism 58 slides on the inner peripheral surface of the groove portion 52E, and due thereto, vibration energy that is generated at the front hood 10 is absorbed, but the structure of the displacement mechanism 58 is not limited to this. For example, there may be a structure in which the groove portion 52E at the displacement mechanism 58 is omitted, and, as shown in FIG. 13A and FIG. 13B, a surplus length portion 70 is formed at at least one of the first link 52 and the second link 54, and the surplus length portion 70 is made to be the displacement mechanism 58. For example, in the example shown in FIG. 13A, the surplus length portion 70 is formed at the first link 52, and the surplus length portion 70 is formed in a substantial bellows-shape that extends in the vehicle transverse direction. On the other hand, in the example shown in FIG. 13B, the surplus length portions 70 are formed at the first link 52 and the second link 54, and the surplus length portions 70 are formed in substantial bellows shapes that extend in the vertical direction. Further, the other end portion of the connecting portion 50 (the second link 54) may be displaced toward the upper side due to the surplus length portion 70 plastically deforming at the time when a predetermined load toward the upper side is inputted to the other end portion of the connecting portion 50 from the front hood 10 at the raised position of the front hood 10. Namely, there is a structure in which, when a predetermined load toward the upper side is inputted from the front hood 10 to the other end portion of the connecting portion 50, tensile load is applied to the surplus length portion 70, and the surplus length portion 70 plastically deforms toward the length direction outer side of the connecting portion 50. In accordance with this structure, vibration energy of the front hood 10 can be absorbed by a simple structure, as compared with a case in which vibration energy of the front hood 10 is absorbed by frictional force. Further, the load that plastically deforms the surplus length portion 70 can be set easily.

Further, for example, there may be a structure in which vibration energy of the front hood 10 is absorbed by frictional force that arises between the cylinder 32 and the rod 40 of the actuator 30. In this case, the width dimension of the groove portion 52E at the displacement mechanism 58 is set to be greater than the diameter dimension of the connecting shaft 56. Moreover, there may be a structure in which the spring constant of the lock ring 38 of the actuator 30 is adjusted appropriately, and vibration energy of the front hood 10 is absorbed by the frictional force that arises at the time when the lock ring 38, that moves together with the cylinder 32, slides on the bottom surface 40D1 of the holding groove 40D of the rod 40.

Further, in the first embodiment, the shaft portion 56A of the connecting shaft 56 is formed in a circular shape in cross-section, but the cross-sectional shape of the shaft portion 56A is not limited to this. For example, as shown in FIG. 14A and FIG. 14B, the cross-section of the shaft portion 56A may be formed substantially in the shape of a track having a pair of rectilinear portions. In this case, the pair of rectilinear portions can be structured as stopper surfaces 56C. Namely, as shown in FIG. 14B, the orientation of the connecting shaft 56 is set such that, when the connecting portion 50 switches to the operating state, the stopper surfaces 56C are disposed parallel to the inner peripheral surface of the groove portion 52E. Further, the distance between the pair of stopper surfaces 56C is set to be greater than the width dimension of the groove portion 52E. Due thereto, when the displacement mechanism 58 operates and the connecting shaft 56 is inserted into the groove portion 52E, the stopper surfaces 56C and the inner peripheral surface of the groove portion 52E engage, and relative pivoting of the first link 52 and the second link 54 is limited. Namely, the connecting portion 50 bending at the region of the connecting shaft 56 is limited. Due thereto, the state of the connecting portion 50 at the time when vibration of the front hood 10 is suppressed can be stabilized by the displacement mechanism 58 of the connecting portion 50. Note that, in this case, the cross-section of the shaft portion 56A may be formed in a D-shape, and the stopper surface 56C may be formed at one place.

Further, in the first embodiment, the holding hole 52F is formed at the other end portion of the groove portion 52E, but, at the other end portion of the groove portion 52E, the groove portion 52E may be extended and the holding hole 52F omitted.

Further, in the first embodiment, the connection hole 52D, the groove portion 52E, the holding hole 52F are formed in the first link 52, and the connecting shaft 56 is provided at the second link 54. Instead, the connection hole 52D, the groove portion 52E, the holding hole 52F may be formed at the second link 54, and the connecting shaft 56 may be provided at the first link 52. In this case, in the operating state of the connecting portion 50, the groove portion 52E is extended-out toward the lower side from the connection hole 52D.

Second Embodiment

A PUH device 100 relating to a second embodiment is described hereinafter by using FIG. 15 through FIG. 17. The PUH device 100 of the second embodiment is structured similarly to the PUH device 20 of the first embodiment, except for the following points. Note that, in FIG. 15 through FIG. 17, the PUH device 100 that is disposed at the left side is shown in a vehicle side view that is seen from the vehicle transverse direction outer side.

Figure 15:
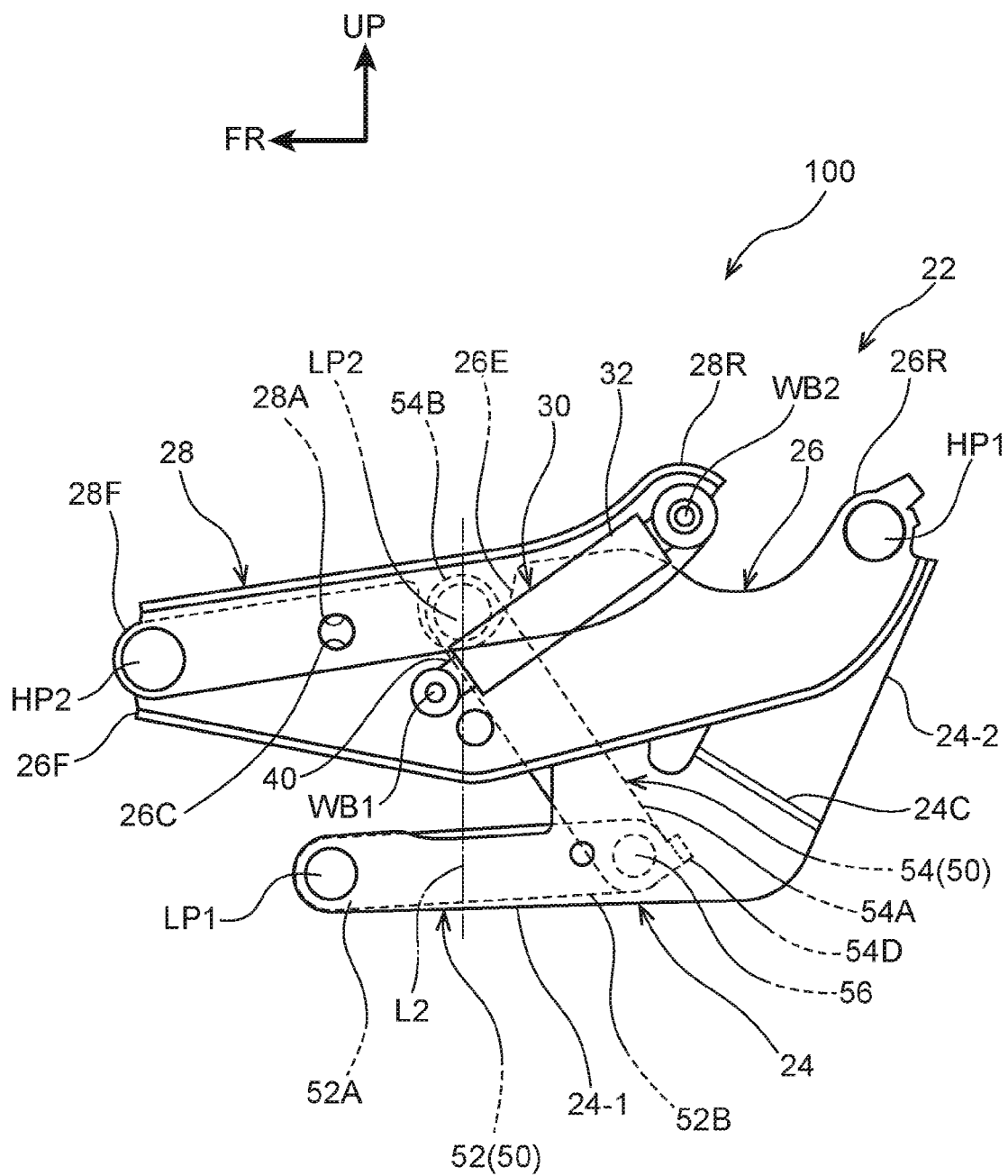
FIG. 15 is a side view that is seen from the vehicle left side and that shows a state before operation of a vehicle pop-up hood device relating to a second embodiment.
Figure 16:
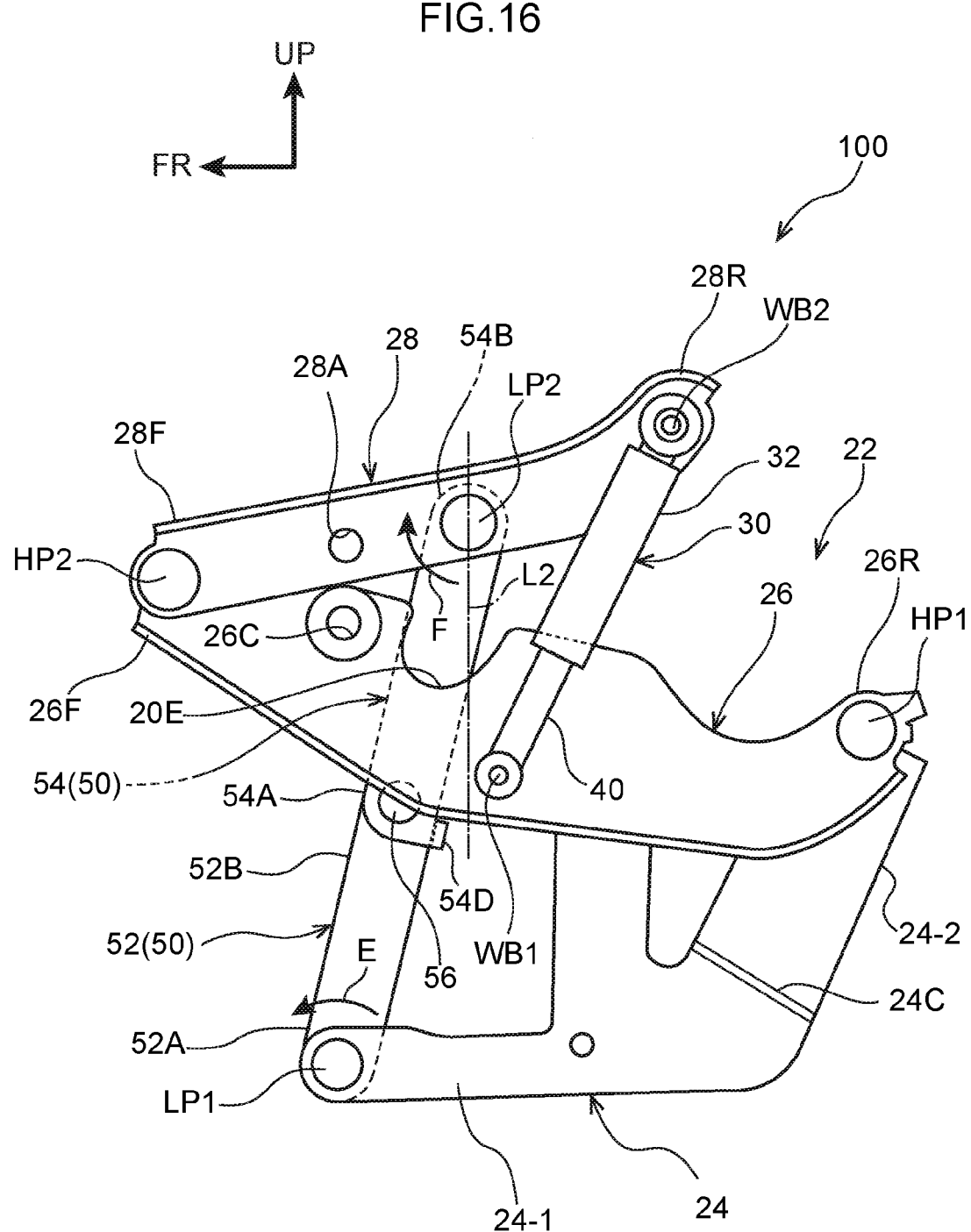
FIG. 16 is a side view that is seen from the vehicle left side and that shows a state after operation of the vehicle pop-up hood device shown in FIG. 15.
Figure 17:
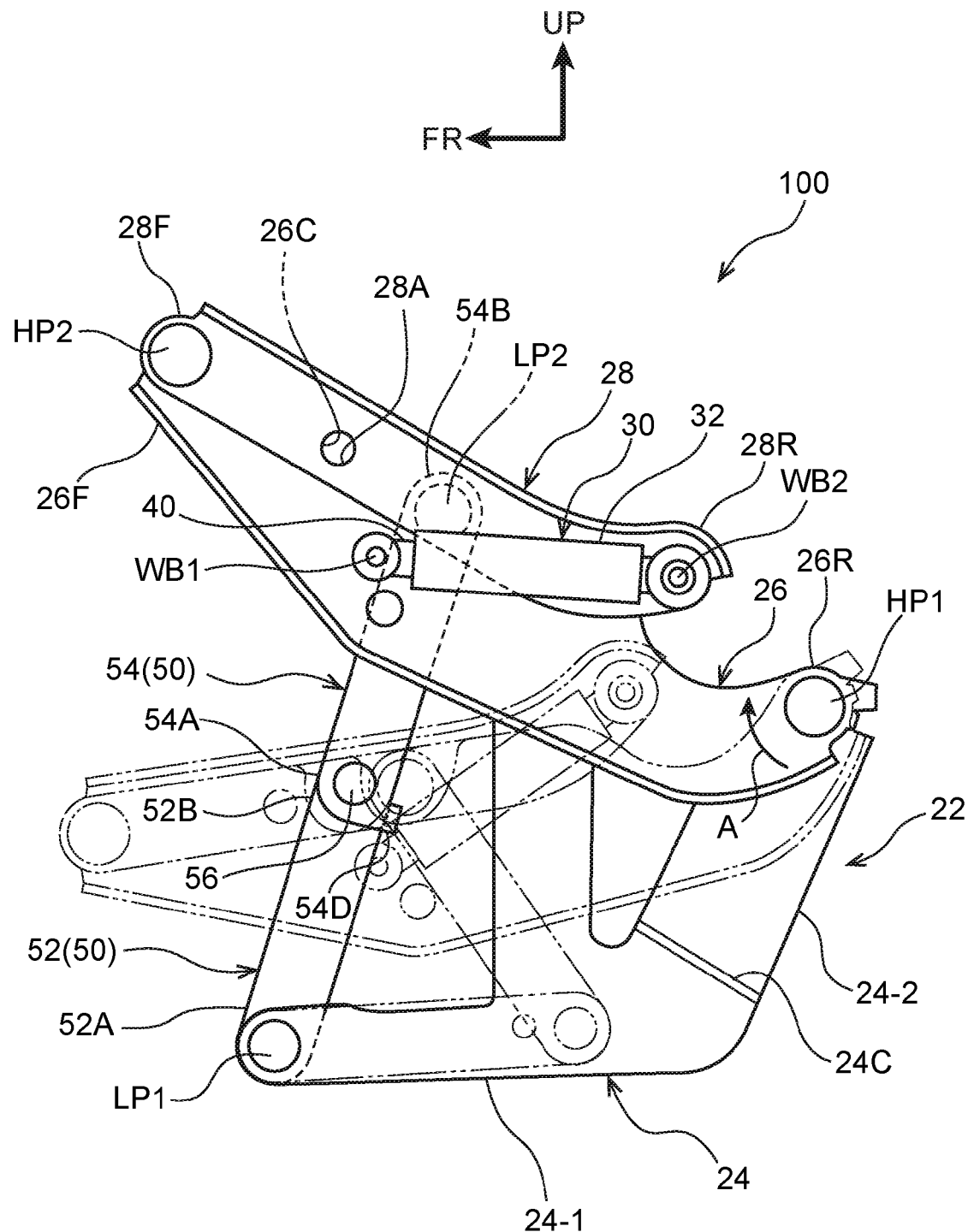
FIG. 17 is a side view that is seen from the vehicle left side and that shows the state of the vehicle pop-up hood device shown in FIG. 15 at a time of opening/closing of the hood.

As shown in FIG. 15 through FIG. 17, at the hinge base 24, a step portion 24C is formed at the vertical direction intermediate portion of the side wall portion 24-2, and the upper end portion of the hinge base 24 is disposed toward the vehicle transverse direction outer side with respect to the lower end portion thereof.

Further, a concave portion 26E, that opens toward the upper side as seen in a vehicle side view, is formed in the intermediate portion in the longitudinal direction of the first arm 26, and the second link pin LP2 is disposed in the concave portion 26E. Further, the curved portion 26A and the first bulging portion 26B are omitted from the first arm 26.

At the connecting portion 50, the first link intermediate portion 52C is omitted from the first link 52, and the second link intermediate portion 54C is omitted from the second link 54. Namely, the first link 52 and the second link 54 are formed in substantial flat plate shapes. Further, at the connecting portion 50, the displacement mechanism 58 of the first embodiment is omitted. Namely, only the connection hole 52D (not illustrated) is formed in the other end portion 52B of the first link 52, and the groove portion 52E and the holding hole 52F are omitted. Due thereto, in the second embodiment, there is a structure in which, at the raised position, the other end portion of the connecting portion 50 (the other end portion 54B of the second link 54) cannot be displaced toward the upper side with respect to the first link 52 (the hinge base 24).

Further, the one end portion 52A of the first link 52 is pivotably connected by the first link pin LP1 at the front end portion of the side wall portion 24-2 of the hinge base 24. On the other hand, the other end portion 54B of the second link 54 is pivotably connected by the second link pin LP2 at the length direction intermediate portion of the second arm 28.

Further, as shown in FIG. 15, in the stored state of the connecting portion 50, the connecting portion 50 forms a substantial V-shape that opens toward the front side as seen in a vehicle side view, and is stored between the hinge base 24 and the second arm 28. Namely, the connecting shaft 56 is disposed at the rear side with respect to the imaginary reference line L2. On the other hand, as shown in FIG. 16, when the actuator 30 operates and the second arm 28 is raised-up to the raised position and the connecting portion 50 switches to the operating state, the first link 52 and the second link 54 are lined-up on the same line, and the connecting portion 50 is set so as to be rectilinear. Concretely, the connecting portion 50 is disposed so as to be tilted slightly toward the rear side while heading toward the upper side as seen in a side view. Due thereto, in the operating state, the connecting shaft 56 is disposed at the front side with respect to the imaginary reference line L2.

Moreover, as shown in FIG. 17, at the time of usual opening/closing of the front hood 10, the first arm 26 pivots around the first hinge pin HP1 toward the upper side (the arrow A direction side) with respect to the hinge base 24. At this time, the first link 52 pivots relative to the hinge base 24, and the second link 54 pivots relative to the second arm 28, and the connecting portion 50 that was in the stored state becomes linear, and the range of pivoting in the opening direction of the front hood 10 is restricted (hereinafter, this state is called the "pivoting restricting state"). Further, in the pivoting restricting state of the connecting portion 50, the connecting portion 50 is disposed so as to be inclined slightly toward the rear side while heading toward the upper side as seen in a side view.

Further, as shown in FIG. 15 through FIG. 17, a stopper 54D is formed integrally with the one end portion 54A of the second link 54, at the side portion at a transverse direction one side of the second link 54. This stopper 54D is structured so as to project-out from the second link 54 toward the vehicle transverse direction inner side, and be able to abut the side surface at the transverse direction one side of the first link 52. Concretely, as shown in FIG. 16, when the connecting portion 50 switches from the stored state to the operating state, the stopper 54D abuts the side surface at the transverse direction one side of the first link 52, and pivoting of the first link 52 and the second link 54 toward the opposite side (the arrow E direction side at the first arm 26 and the arrow F direction side at the second link 54) of the stored state is limited. Namely, overrunning of the first link 52 and the second link 54 that switch to the operating state (the first link 52 pivoting toward the arrow E direction side and the second link 54 pivoting toward the arrow F direction side further past the operating state) is suppressed.

Moreover, although not illustrated, at the actuator 30, the gas vent holes 32A at the cylinder 32 are omitted. Further, the width dimension of the holding groove 40D of the actuator 30 (the vertical dimension of the bottom surface 40D1) is set to be smaller than in the first embodiment, and, at the raised position, the cylinder 32 that has risen from the rod 40 is held by the lock ring 38.

Further, at the PUH device 100 of the second embodiment as well, the second arm 28 that is fixed to the front hood 10 is connected by the connecting portion 50 to the hinge base 24. Further, when the actuator 30 operates and the front hood 10 is raised-up to the raised position, the connecting portion 50 switches from the stored state to the operating state, and movement of the second arm 28 toward the upper side with respect to the hinge base 24 is restricted by the connecting portion 50. Due thereto, the second arm 28 is connected by the connecting portion 50 to the hinge base 24 that is fixed to a region of high rigidity at the vehicle body, and movement of the second arm 28 toward the upper side with respect to the hinge base 24 can be restricted. Accordingly, in the second embodiment as well, vibration of the front hood 10 at the time of completion of popping-up can be suppressed.

Note that, from the standpoint of damping at an early stage the vibration of the front hood 10 that is raised to the raised position, as in the first embodiment, it is desirable that the displacement mechanism 58 be provided at the connecting portion 50. However, for example, at various types of vehicles, in a case in which the bending rigidity of the front hood is structured to be relatively high, or the like, overshooting of the front hood is relatively small when the vehicle transverse direction both end portions of the front hood are raised-up by the actuators 30. Accordingly, in the case of a vehicle having such a front hood, vibration of the front hood 10 at the time of completion of popping-up can be suppressed even if the displacement mechanism 58 is omitted from the connecting portion 50 as in the second embodiment.

Further, in the second embodiment, in the non-operating state of the actuator 30, when the first arm 26 pivots together with the second arm 28 relative to the hinge base 24, the connecting portion 50 switches from the stored state to the pivoting restricting state. Due thereto, the range of pivoting of the front hood 10 is restricted. Accordingly, there is no need to separately provide a restricting portion that restricts the range of pivoting of the front hood 10. As a result, simplification of the structure of the hood hinge 22 can be devised.

Moreover, in the second embodiment, in the same way as in the first embodiment, at the raised position, the hinge base 24 and the second arm 28 are connected by the connecting portion 50 that has switched to the operating state. Due thereto, at the time when a collided-with object abuts the front hood 10 that has popped-up, the front hood 10 withdrawing toward the rear side can be suppressed.

Further, in the second embodiment, the actuator 30 is disposed at the vehicle transverse direction outer side (one side) with respect to the first arm 26 and the second arm 28, and the connecting portion 50 is disposed at the vehicle transverse direction inner side (other side) with respect to the first arm 26 and the second arm 28. Therefore, compactness of the PUH device 100 in the vehicle transverse direction can be devised.

Further, in the second embodiment, the stopper 54D is formed integrally with the one end portion 54A of the second link 54, and, when the first link 52 switches from the stored state to the operating state, the stopper 54D abuts the side surface at the transverse direction one side of the first link 52, and pivoting of the first link 52 and the second link 54 toward the side opposite the stored state is restricted. Due thereto, overrunning of the first link 52 and the second link 54 that switch to the operating state can be suppressed. Accordingly, stabilization of the connecting portion 50 that switches to the operating state can be devised.

Figure 18:
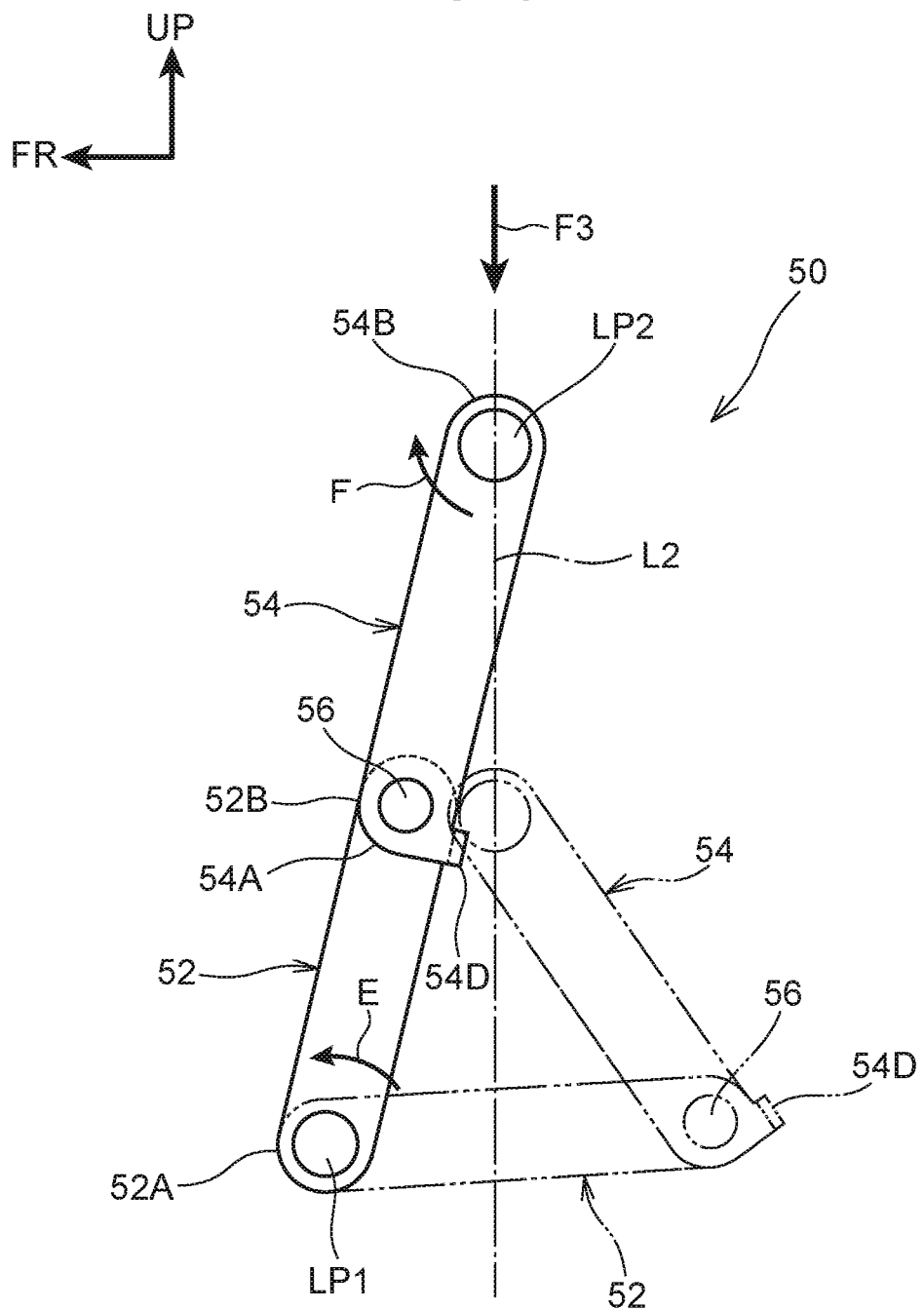
FIG. 18 is an explanatory drawing for explaining behavior of the connecting portion at a time when load of a vehicle lower side is applied to the connecting portion shown in FIG. 17.

Further, as shown in FIG. 18, in the second embodiment, in the stored state of the connecting portion 50, the connecting portion 50 forms a substantial V-shape that opens toward the front side as seen in a side view, and the connecting shaft 56 is disposed at the rear side (a vehicle longitudinal direction one side) with respect to the imaginary reference line L2. On the other hand, when the connecting portion 50 switches to the operating state, the connecting portion 50 is disposed so as to be rectilinear, and the connecting portion 50 is disposed at the front side (a vehicle longitudinal direction other side) with respect to the imaginary reference line L2. Therefore, in the operating state, when load toward the vehicle lower side (refer to arrow F3 in FIG. 18) is applied to the other end portion of the connecting portion 50, the first link 52 and the second link 54 start to pivot further in the overrunning direction than the operating state. Namely, the first link 52 (the second link 54) starts to pivot toward the arrow E direction side (the arrow F direction side). At this time, the stopper 54D abuts the side surface of the first link 52, and pivoting of the first link 52 and the second link 54 is restricted. Due thereto, the stopper 54D can be made to function stably. As a result, the front hood 10 can be maintained stably at the raised position.

Note that, in the second embodiment, an example is described in which the PUH device 100 is structured by using the actuator 30 of a type in which the cylinder 32 extends-out with respect to the rod 40, but the structure of the actuator 30 is not limited to this. For example, the PUH device 100 may be structured by using an actuator of a type that pivots the second arm 28 with respect to the first arm 26 due to an urged spring being released.

Further, in the first embodiment and the second embodiment, an example is described in which the actuator 30 and the connecting portion 50 are disposed at the vehicle transverse direction outer side and inner side, respectively, with respect to the first arm 26 and the second arm 28, but the placement of the actuator 30 and the connecting portion 50 is not limited to this. For example, the actuator 30 and the connecting portion 50 may be disposed at the vehicle transverse direction outer side with respect to the first arm 26 and the second arm 28, or may be disposed at the vehicle transverse direction inner side. In this way, it suffices to appropriately set the placement of the actuator 30 and the connecting portion 50 in consideration of the clearance with other members at the periphery of the hood hinge 22, and the like.

Further, in the second embodiment, in the non-operating state of the actuator 30, when the first arm 26 is pivoted together with the second arm 28 with respect to the hinge base 24, the connecting portion 50 switches from the stored state to the pivoting restricting state, but, in the first embodiment as well, the connecting portion 50 may be set so as to switch from the stored state to the pivoting restricting state. Namely, there may be a structure in which, for example, the lengths of the first link 52 and the second link 54, or the like, are adjusted appropriately, and the connecting portion 50 is provided with the function of restricting the range of pivoting of the front hood 10.

Moreover, in the second embodiment, an example is described in which the connecting portion 50 is made to have the function of restricting the range of pivoting of the front hood 10, but there can be a structure in which the connecting portion 50 is not made to have the function of restricting the range of pivoting of the front hood 10.

Further, in the second embodiment, there is a structure in which the stopper 54D is provided at the connecting portion 50, and overrunning of the first link 52 and the second link 54 that switch to the operating state is suppressed. However, the stopper 54D may be provided at the connecting portion 50 in the first embodiment as well. Due thereto, overrunning of the first link 52 and the second link 54 that switch to the operating state can be suppressed in the first embodiment as well.

Moreover, a stopper, that suppresses overrunning of the first link 52 and the second link 54 that switch to the operating state, may be formed at another member that is different from the connecting portion 50. Hereinafter, to describe this example by using the first embodiment, for example, a stopper 24S may be formed at the side wall portion 24-2 of the hinge base 24 as shown by the two-dot chain line in FIG. 1. Concretely, the stopper 24S extends-out toward the upper side from the upper edge portion at the longitudinal direction intermediate portion of the side wall portion 24-2 and is bent toward the vehicle transverse direction outer side, and forms a substantially backwards L-shape as seen in a vehicle front view. Further, the stopper 24S is set so as to abut the side surface at the transverse direction other side of the first link 52 that switches to the operating state. Due thereto, overrunning of the first link 52 and the second link 54 that switch to the operating state can be suppressed.

Figure 19:
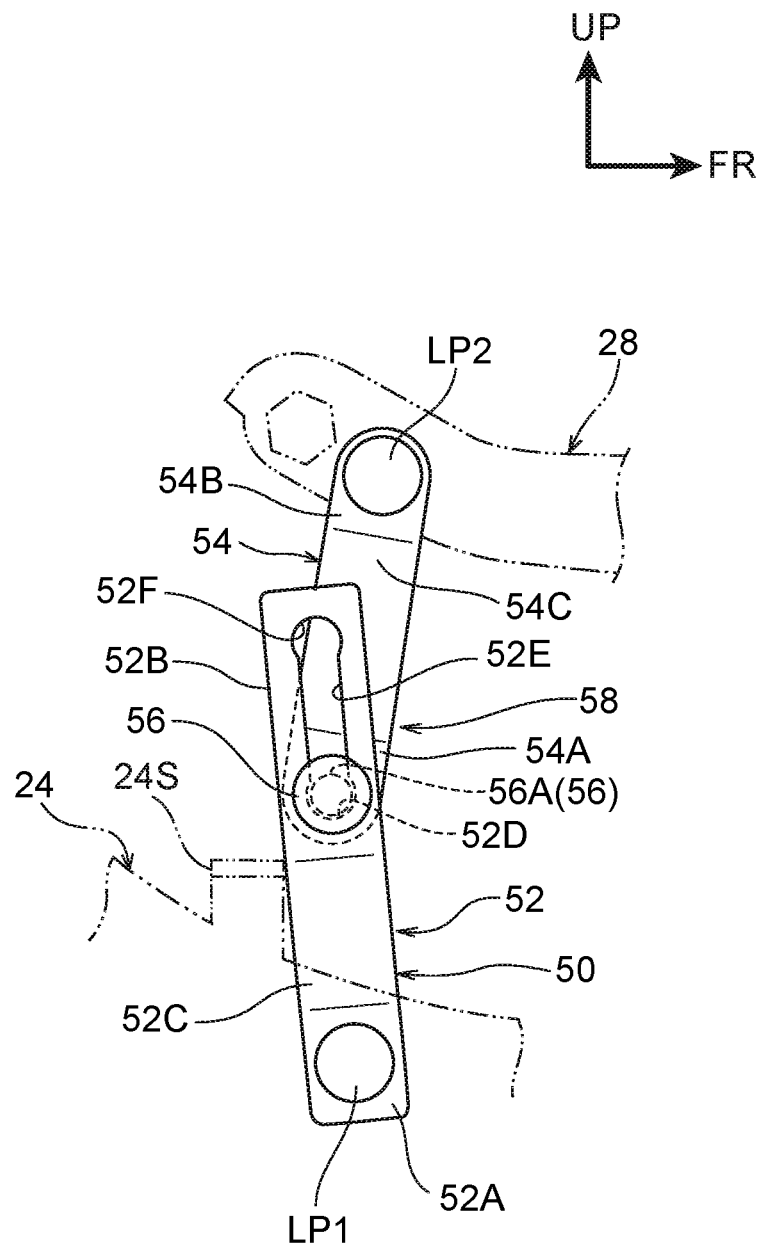
FIG. 19 is an explanatory drawing for explaining another state of the operating state of the connecting portion at the vehicle pop-up hood device relating to the first embodiment.

Moreover, in a case in which the stopper 24S is formed at the hinge base 24, as shown in FIG. 19, the lengths of the first link 52 and the second link 54 and the position of the connecting shaft 56 and the like may be set appropriately such that the connecting portion 50 that switches to the operating state forms a substantial V-shape that opens toward the front side. Namely, the form of the connecting portion 50 in the operating state is not limited to a form of extending rectilinearly in the vertical direction, and may be a form of being bent at a region at the length direction intermediate portion of the connecting portion 50 (the region of the connecting shaft 56) such as shown in FIG. 19.

Further, in the second embodiment, an example is described in which the PUH device 100 is structured by using the connecting portion 50 that has plural links (the first link 52 and the second link 52), but the structure of the connecting portion 50 is not limited to this. For example, a wire or the like that can be curved may be structured as the connecting portion.

The PUH devices 20, 100 have been described above in the first embodiment and the second embodiment, but the vehicle pop-up hood device of the present disclosure is not limited to the above, and can, of course, be implemented by being modified in various ways other than the above within a scope that does not depart from the gist thereof.

The invention claimed is:

1. A vehicle pop-up hood device comprising:
   a hinge base that is fixed to a vehicle body;
   a first arm that is pivotably connected to the hinge base;
   a second arm that is fixed to a vehicle transverse direction outer side end portion at a rear portion of a hood, and is pivotably connected to the first arm, and that, by being pivoted with respect to the first arm, moves the vehicle transverse direction outer side end portion at the rear portion of the hood toward a vehicle upper side;
   an actuator that is provided between the first arm and the second arm, and that, by being operated, pivots the second arm with respect to the first arm and raises the hood up from a closed position to a raised position; and
   a connecting portion whose one end portion is connected to the hinge base and whose other end portion is connected to the second arm, and that, at the closed position of the hood, is set in a stored state, at a time of completion of operation of the actuator, the connecting portion being set in an operating state in which the connecting portion restricts movement of the second arm toward the vehicle upper side with respect to the hinge base.

2. The vehicle pop-up hood device of claim 1, wherein, at a time when the first arm is pivoted with respect to the hinge base in a non-operating state of the actuator, the connecting portion is switched from the stored state to a pivoting restricting state, and restricts a range of pivoting of the hood.

3. The vehicle pop-up hood device of claim 1, wherein the connecting portion is structured to include
   a first link that structures one end side of the connecting portion and that is pivotably connected to the hinge base,
   a second link that structures the other end side of the connecting portion and that is pivotably connected to the second arm, and
   a connecting shaft that is provided at one of the first link and the second link and that is pivotably supported at a connection hole formed in the other of the first link and the second link.

4. The vehicle pop-up hood device of claim 3, wherein the connecting portion has a displacement mechanism that permits displacement toward the vehicle upper side at the other end portion of the connecting portion, and when a predetermined load toward the vehicle upper side is applied to the other end portion of the connecting portion by the hood that has been raised to the raised position, the displacement mechanism operates and permits displacement toward the vehicle upper side at the other end portion of the connecting portion, and permits movement of the second arm to an upper limit position that is further toward the vehicle upper side than the raised position.

5. The vehicle pop-up hood device of claim 4, wherein the displacement mechanism is structured to absorb vibration energy of the hood due to the other end portion of the connecting portion being displaced from the raised position to the upper limit position.

6. The vehicle pop-up hood device of claim 5, wherein the displacement mechanism is structured to include the connecting shaft, and a groove portion that is formed in the other of the first link and the second link and whose one end portion communicates with the connection hole, and in the operating state, the groove portion is disposed so as to extend in a vehicle vertical direction, and a width dimension of the groove portion is set to be smaller than a diameter dimension of the connecting shaft.

7. The vehicle pop-up hood device of claim 6, wherein the displacement mechanism has a holding hole that is formed at the other end portion of the groove portion, and at the upper limit position, the connecting shaft is held by the holding hole.

8. The vehicle pop-up hood device of claim 6, wherein, at the displacement mechanism, sliding resistance of the connecting shaft with respect to the groove portion when the connecting shaft moves from the other end of the groove portion to the one end of the groove portion, is set to be lower than sliding resistance of the connecting shaft with respect to the groove portion when the connecting shaft moves from the one end of the groove portion to the other end of the groove portion.

9. The vehicle pop-up hood device of claim 4, wherein the displacement mechanism is made to be a surplus length portion that is formed at at least one of the first link and the second link, and at a time of operation of the displacement mechanism, displacement toward the vehicle upper side at the other end portion of the connecting portion is permitted due to the surplus length portion plastically deforming.

10. The vehicle pop-up hood device of claim 3, wherein the actuator is disposed at a vehicle transverse direction one side with respect to the first arm and the second arm, and the connecting portion is disposed at a vehicle transverse direction other side with respect to the first arm and the second arm.

11. The vehicle pop-up hood device of claim 10, wherein the hinge base is disposed at the vehicle transverse direction other side with respect to the connecting portion, a region of connection with the second arm at the second link is disposed adjacent to a region of connection of the actuator and the second arm, and an interconnection portion, that extends in a vehicle transverse direction and interconnects length direction both end portions of the first link, is formed at a length direction intermediate portion of the first link.

12. The vehicle pop-up hood device of claim 3, wherein a stopper is provided at the connecting portion, and in the operating state, pivoting of the first link and the second link toward a side opposite the stored state is limited by the stopper.

13. The vehicle pop-up hood device of claim 12, wherein the other end portion of the second link is connected to the second arm by a connecting pin, and given that a line, that passes-through an axial center of the connecting pin as seen in a side view and runs along a vehicle vertical direction, is made to be an imaginary reference line, in the stored state, the connecting shaft is disposed at a vehicle longitudinal direction one side with respect to the imaginary reference line, and, in the operating state, the connecting shaft is disposed at a vehicle longitudinal direction other side with respect to the imaginary reference line.

* * * * *